US012561875B2

(12) United States Patent
Liu

(10) Patent No.: US 12,561,875 B2
(45) Date of Patent: Feb. 24, 2026

(54) ANIMATION FRAME DISPLAY METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Shuchang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 231 days.

(21) Appl. No.: 18/455,592

(22) Filed: Aug. 24, 2023

(65) Prior Publication Data

US 2023/0401772 A1      Dec. 14, 2023

Related U.S. Application Data

(63) Continuation of application No. PCT/CN2022/127133, filed on Oct. 24, 2022.

(30) Foreign Application Priority Data

Jan. 5, 2022    (CN) .......................... 202210006550.9

(51) Int. Cl.
G06T 13/00          (2011.01)
G06T 5/70          (2024.01)

(52) U.S. Cl.
CPC ................ G06T 13/00 (2013.01); G06T 5/70 (2024.01)

(58) Field of Classification Search
CPC ......... G06T 13/00; G06T 5/70; A63F 13/837; A63F 2300/6607; A63F 13/52;
(Continued)

(56) References Cited

U.S. PATENT DOCUMENTS

2004/0130550 A1*    7/2004    Blanco .................. G06T 15/005
                                                                        345/473
2005/0128220 A1      6/2005    Marrin et al.
                                (Continued)

FOREIGN PATENT DOCUMENTS

CN          106816134 A        6/2017
CN          112927332 A        6/2021
                                (Continued)

OTHER PUBLICATIONS

The World Intellectual Property Organization (WIPO) International Search Report for PCT/CN2022/127133 Dec. 28, 2022 13 Pages (including translation).
(Continued)

*Primary Examiner* — Kent W Chang
*Assistant Examiner* — Karl Duc Truong
(74) *Attorney, Agent, or Firm* — Anova Law Group, PLLC

(57) ABSTRACT

An animation frame display method includes obtaining a resource consumption index based on an initial animation update frequency of at least one virtual model, the resource consumption index indicating a quantity of resources required to be consumed for animation update according to the initial animation update frequency of the at least one virtual model; obtaining a target animation update frequency of the at least one virtual model based on the resource consumption index and the initial animation update frequency; and displaying an animation frame corresponding to the at least one virtual model according to the target animation update frequency.

18 Claims, 8 Drawing Sheets

(58) Field of Classification Search
CPC ........ A63F 13/56; G09G 5/001; G09G 5/363;
G09G 2340/0435; G09G 2350/00
See application file for complete search history.

(56) References Cited

U.S. PATENT DOCUMENTS

| | | | |
|---|---|---|---|
| 2009/0167768 A1 | 7/2009 | Bull et al. | |
| 2011/0018881 A1* | 1/2011 | Nash ...................... | G06T 13/00 |
| | | | 345/473 |
| 2011/0096077 A1 | 4/2011 | Jarrett et al. | |
| 2013/0300749 A1* | 11/2013 | Harada ................... | G06T 13/20 |
| | | | 345/473 |
| 2017/0178408 A1* | 6/2017 | Bavor, Jr. ............. | G06T 19/006 |
| 2020/0368623 A1* | 11/2020 | Wu ......................... | A63F 13/58 |

FOREIGN PATENT DOCUMENTS

| | | | |
|---|---|---|---|
| CN | 114299201 A | | 4/2022 |
| JP | 2011186834 A | * | 9/2011 |

OTHER PUBLICATIONS

The Japan Patent Office (JPO) Notice of Reasons for Refusal for Application No. 2023-575358 Jan. 14, 2025 7 Pages (including translation).
The European Patent Office (EPO) The Extended European Search Report for Application No. 22918260.5 May 2, 2025 11 Pages.
Thomas A. Funkhouser et al., "Adaptive display algorithm for interactive frame rates during visualization of complex virtual environments." Proceedings of the 20th annual conference on Computer graphics and interactive techniques. 1993.

* cited by examiner

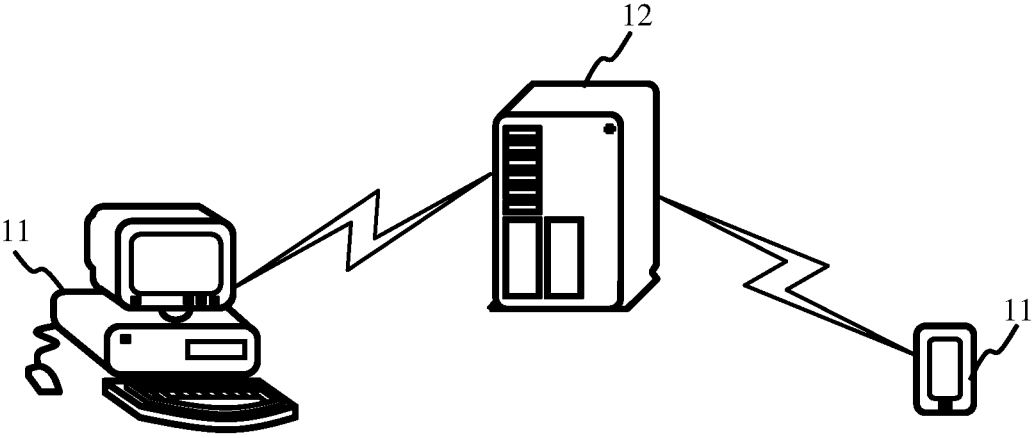

FIG. 1

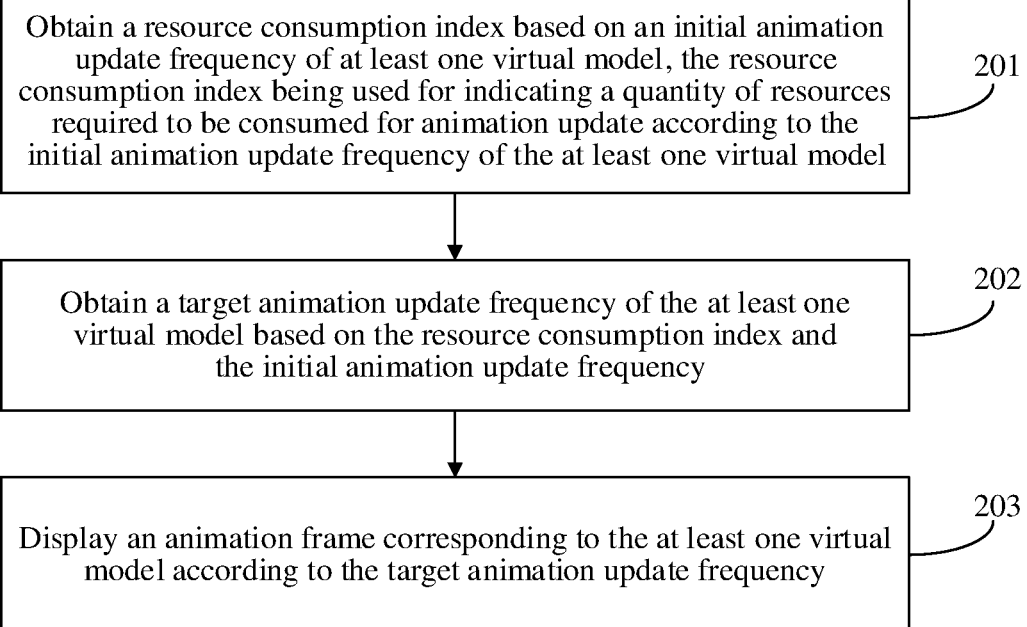

Obtain a resource consumption index based on an initial animation update frequency of at least one virtual model, the resource consumption index being used for indicating a quantity of resources required to be consumed for animation update according to the initial animation update frequency of the at least one virtual model — 201

Obtain a target animation update frequency of the at least one virtual model based on the resource consumption index and the initial animation update frequency — 202

Display an animation frame corresponding to the at least one virtual model according to the target animation update frequency — 203

FIG. 2

URO3 ----▶ URO6

URO2 ----▶ URO4

URO1 ----▶ URO2

ANIMATION FRAME DISPLAY METHOD AND APPARATUS, DEVICE, AND STORAGE MEDIUM

CROSS-REFERENCES TO RELATED APPLICATIONS

This application is a continuation application of PCT Patent Application No. PCT/CN2022/127133, filed on Oct. 24, 2022, which claims priority to Chinese Patent Application No. 202210006550.9, filed on Jan. 5, 2022, contents of both of which are incorporated by reference in their entirety.

FIELD OF THE TECHNOLOGY

Embodiments of the present disclosure relate to the field of computers, and in particular, to an animation frame display method and apparatus, a device, and a storage medium.

BACKGROUND OF THE DISCLOSURE

With the development of computer technology, virtual environment provided in various applications includes at least one virtual model. When a terminal displays a picture of the virtual environment, an animation frame of the at least one virtual model may be displayed in the picture for being viewed by interactive objects.

Often, an animation frame corresponding to a virtual model is directly displayed according to an initial animation update frequency of the virtual model. The initial animation update frequency of the virtual model is determined based on a ratio of a rendering size of the virtual model to a reference size.

SUMMARY

One aspect of the present disclosure provides an animation frame display method, performed by an electronic device. The method includes obtaining a resource consumption index based on an initial animation update frequency of at least one virtual model, the resource consumption index indicating a quantity of resources required to be consumed for animation update according to the initial animation update frequency of the at least one virtual model; obtaining a target animation update frequency of the at least one virtual model based on the resource consumption index and the initial animation update frequency; and displaying an animation frame corresponding to the at least one virtual model according to the target animation update frequency.

Another aspect of the present disclosure provides a computer device. The computer device includes a processor and a memory, the memory storing at least one computer instruction, and the at least one computer instruction being loaded and executed by the processor for performing an animation frame display method. The method includes obtaining a resource consumption index based on an initial animation update frequency of at least one virtual model, the resource consumption index indicating a quantity of resources required to be consumed for animation update according to the initial animation update frequency of the at least one virtual model; obtaining a target animation update frequency of the at least one virtual model based on the resource consumption index and the initial animation update frequency; and displaying an animation frame corresponding to the at least one virtual model according to the target animation update frequency.

Another aspect of the present disclosure provides a non-transitory computer-readable storage medium, storing at least one computer program, the at least one computer program being loaded and executed by a processor for performing an animation frame display method. The method includes obtaining a resource consumption index based on an initial animation update frequency of at least one virtual model, the resource consumption index indicating a quantity of resources required to be consumed for animation update according to the initial animation update frequency of the at least one virtual model; obtaining a target animation update frequency of the at least one virtual model based on the resource consumption index and the initial animation update frequency; and displaying an animation frame corresponding to the at least one virtual model according to the target animation update frequency.

As disclosed, an animation frame corresponding to at least one virtual model is displayed according to a target animation update frequency of the at least one virtual model. The target animation update frequency of the at least one virtual model is determined on the basis of an initial animation update frequency of the at least one virtual model and in consideration of a resource consumption index. Resource consumption can be effectively and globally controlled according to the target animation update frequency of the at least one virtual model, which is beneficial to improving the display fluency of animation frames and thus improving the human-computer interaction rate.

BRIEF DESCRIPTION OF THE DRAWINGS

FIG. 1 is a schematic diagram of an implementation environment of an animation frame display method according to an embodiment of the present disclosure.

FIG. 2 is a flowchart of an animation frame display method according to an embodiment of the present disclosure.

DESCRIPTION OF EMBODIMENTS

Figure 3:
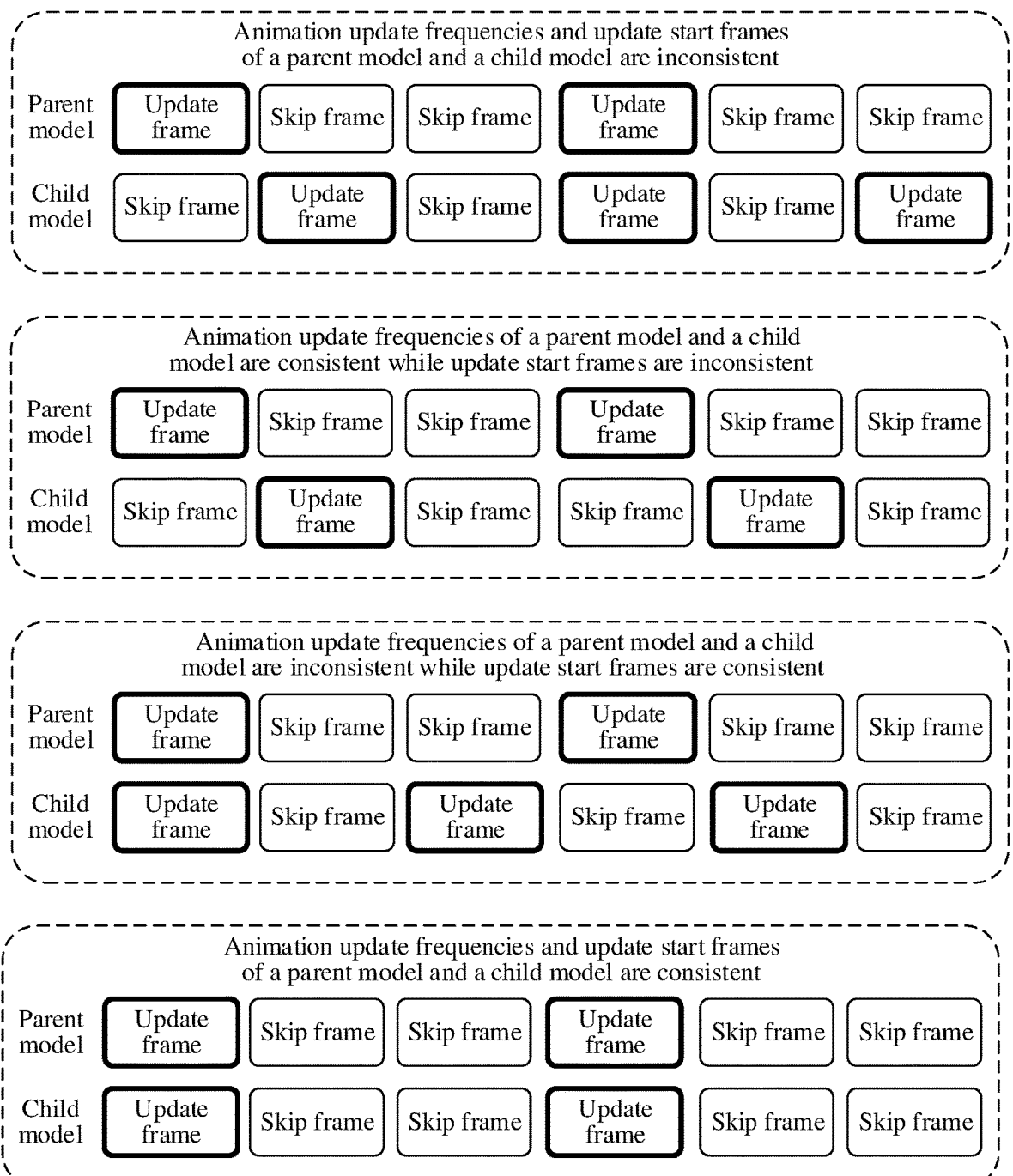
FIG. 3 is a schematic diagram of an animation update synchronization situation according to an embodiment of the present disclosure.

To make the objects, technical solutions, and advantages of the present disclosure clearer, the following further describes implementations of the present disclosure in detail with reference to the accompanying drawings.

The terms involved in the embodiments of the present disclosure are described as follows.

Virtual Environment: The virtual environment is an environment provided (or displayed) when an application is run on a terminal. The virtual environment refers to a created environment in which virtual objects act. The virtual environment may be a two-dimensional virtual environment, a 2.5-dimensional virtual environment, or a three-dimensional virtual environment. The virtual environment may be a simulated environment of a real world, a semi-simulated semi-fictional environment, or a purely fictional environment.

Virtual Object: The virtual object is an active object in the virtual environment. The virtual object may be a virtual character, a virtual animal, or an animated character. Interactive objects may control virtual objects via peripheral components or by clicking/tapping and touching a display screen. Each virtual object has a corresponding shape and volume in the virtual environment, and occupies a portion of space in the virtual environment. For example, when the virtual environment is a three-dimensional virtual environment, the virtual object is a three-dimensional stereo model created based on animated skeleton technology.

Virtual Model: The virtual model refers to a model composed of bones in the virtual environment. The virtual model includes but is not limited to a virtual object, a virtual prop, a virtual pet, and the like. The terminal presents the virtual model by displaying an animation of the virtual model. The animation of the virtual model is composed of a plurality of animation frames. Each animation frame in the animation of the virtual model is obtained by complex logical calculation according to an association between bones, which requires more resources (for example, central processing unit (CPU) resources). By controlling an animation update frequency of the virtual model, the number of animation frames required to be obtained by logical calculation can be controlled, thus controlling the resource consumption.

Frames Per Second (FPS): The FPS is referred to as a frame rate. As the frame rate is higher, the picture experience is smoother.

Update Rate Optimizations (URO): The URO is an animation frequency reduction optimization technology of the virtual model for an unreal engine 4 (UE4). In some embodiments, the URO may be used for describing the animation update frequency. For example, URO1 represents an animation update per frame, and URO2 represents an animation update every two frames, and so on.

Resource Consumption: Resources are consumed for the animation update of the virtual model. For example, the consumed resources refer to CPU time consumed. As the resource consumption is higher, the CPU time required for the update per frame is longer.

In the related art, an animation frame corresponding to a virtual model is directly displayed according to an initial animation update frequency of the virtual model. The initial animation update frequency of the virtual model is determined based on a ratio of a rendering size of the virtual model to a reference size. Limited information is considered in the manner of displaying animation frames based on the initial animation update frequency of the virtual model, which easily reduces the display fluency of animation frames and leads to low human-computer interaction rate.

FIG. 1 shows a schematic diagram of an implementation environment of an animation frame display method according to an embodiment of the present disclosure. The implementation environment includes: a terminal 11 and a server 12.

An application supporting a virtual environment is installed and run in the terminal 11. An interactive object can use the terminal 11 to control a virtual object to perform activities in the virtual environment provided by the application. The activities include, but are not limited to: adjusting body posture, crawling, walking, running, riding, jumping, driving, picking up, shooting, attacking, throwing, changing positions, and the like. In some embodiments, the terminal 11 is also referred to as an electronic device.

This embodiment of the present disclosure is not limited to the application supporting the virtual environment. For example, the application supporting the virtual environment includes, but is not limited to: virtual reality (VR) applications, augmented reality (AR) applications, three-dimensional map programs, game applications, social applications, interactive entertainment applications, and the like.

For example, the game applications include, but are not limited to, shooting games, multiplayer online battle arena (MOBA) games, simulation games (SLG), and the like. The shooting games refer to all games that use props to attack remotely, including but not limited to first-person shooting (FPS) games and third-personal shooting (TPS) games.

In some embodiments, the application supporting the virtual environment may support at least one of a Windows operating system, an Apple operating system, an Android operating system, an IOS operating system, and a Linux operating system, and applications running in different operating systems may be interconnected. In some embodiments, the application supporting the virtual environment is an application developed based on a three-dimensional engine. In some embodiments, the application supporting the virtual environment is a stand-alone application or a network-online application.

The server 12 is configured to provide a background service for the application supporting the virtual environment, which is installed in the terminal 11. In one embodiment, the server 12 undertakes primary computing tasks, and the terminal 11 undertakes secondary computing tasks. Or, the server 12 undertakes secondary computing tasks, and the terminal 11 undertakes primary computing tasks. Or, the server 12 and the terminal 11 perform cooperative computing using a distributed computing architecture.

In one embodiment, the terminal 11 is any electronic product capable of human-computer interaction with an interactive object through one or more ways such as a keyboard, a touchpad, a touch screen, a remote control, or a voice interaction or handwriting device, for example, a personal computer (PC), a mobile phone, a smartphone, a personal digital assistant (PDA), a wearable device, a handheld portable game device, a pocket PC (PPC), a tablet computer, a smart OBU, a smart TV, a smart speaker, a vehicle-mounted terminal, etc. The server 12 may be one server, a server cluster including a plurality of servers, or a cloud computing service center. A communication connection is established between the terminal 11 and the server 12 by using a wireless network or a wired network.

Those skilled in the art will appreciate that the terminal 11 and the server 12 are illustrated as an example only, and that other existing or future terminals or servers, if applicable to the present disclosure, are also included within the scope of protection of the present disclosure and are herein incorporated by reference.

This embodiment of the present disclosure provides an animation frame display method. The method may be applied to an implementation environment shown in FIG. 1. The method is illustrated by being applied to the terminal 11. As shown in FIG. 2, the animation frame display method according to this embodiment of the present disclosure includes exemplary step 201 to step 203.

In step 201, a resource consumption index is obtained based on an initial animation update frequency of at least one virtual model. The resource consumption index is used for indicating a quantity of resources required to be consumed for animation update according to the initial animation update frequency of the at least one virtual model.

The at least one virtual model refers to a virtual model in a virtual environment that is required to display animation frames by considering resource consumption indexes. This embodiment of the present disclosure is not limited to the number of the at least one virtual model. For example, the at least one virtual model is a virtual model of a target category.

This embodiment of the present disclosure is not limited to classification of the virtual model, which may be set based on experience or may be flexibly adjusted according to application scenarios. For example, when all virtual models are divided into one category, the at least one virtual model is all virtual models required to display animation frames in the same screen. For example, the virtual models are divided into a virtual object category and a virtual prop category. Assuming that the target category is the virtual object category, the at least one virtual model is a virtual model belonging to the virtual object category among all the virtual models required to display animation frames in the same screen. Certainly, there may further be another classification of the virtual model. This embodiment of the present disclosure is not limited thereto.

In an exemplary embodiment, each virtual model identifies a corresponding category by a unique string before an application runs, so as to facilitate subsequent statistics of resource consumption at category granularity.

In the process of running the application, a displayed picture of the virtual environment is continuously updated. The animation frame display method according to this embodiment of the present disclosure occurs in the process of displaying the latest picture of the virtual environment. When displaying a picture of the virtual environment, an animation frame of at least one virtual model is displayed in the picture. This embodiment of the present disclosure introduces an implementation process of displaying the animation frame of the at least one virtual model. When displaying a picture of the virtual environment, besides displaying an animation frame of at least one virtual model in the picture, animation frames of other virtual models or environment elements may be displayed in the picture. This embodiment of the present disclosure is not limited thereto. Unless otherwise specified, the pictures mentioned in this embodiment of the present disclosure all refer to the pictures of the virtual environment.

The initial animation update frequency of the at least one virtual model refers to an animation update frequency of the at least one virtual model for obtaining the resource consumption index. The animation update frequency is used for indicating an animation update per a certain number of frames, and every time an animation is updated, a new animation frame is presented. The new animation frame refers to one animation frame in the animation. For example, if an animation update frequency is that an animation is updated once per n (n is an integer not less than 1) frames, the animation update frequency may be represented as UROn.

Before performing step 201, the initial animation update frequency of the at least one virtual model needs to be obtained. The principle of obtaining the initial animation update frequency of each virtual model is the same, and the process of obtaining an initial animation update frequency of a first virtual model is illustrated. The first virtual model is any virtual model in the at least one virtual model.

For example, the manner of obtaining an initial animation update frequency of a first virtual model includes: taking an animation update frequency of the first virtual model when a previous picture of the virtual environment is displayed as the initial animation update frequency of the first virtual model.

For example, the manner of obtaining an initial animation update frequency of a first virtual model includes: taking a default animation update frequency of the first virtual model as the initial animation update frequency of the first virtual model, where the default animation update frequency of the first virtual model may refer to an inherent attribute of the first virtual model.

For example, the manner of obtaining an initial animation update frequency of a first virtual model includes: determining a proportion of the first virtual model, and taking an animation update frequency corresponding to the proportion of the first virtual model as the initial animation update frequency of the first virtual model. The proportion of the first virtual model is a ratio of a rendering size of the first virtual model to a reference size.

For example, the rendering size of the first virtual model refers to a rendering size of the first virtual model presented in the previous picture of the virtual environment. The reference size is set based on experience or flexibly adjusted according to application scenarios. For different virtual models, the reference size may be the same or different. For example, when the reference size is the same for different virtual models, the reference size may be the size of the picture of the virtual environment. For example, the rendering size of the first virtual model presented in the previous picture of the virtual environment may be identified by an animated frame of the first virtual model displayed when the previous picture of the virtual environment is displayed. That is to say, the proportion of the first virtual model may constantly change with the update of the picture of the virtual environment. In this way, before each picture of the virtual environment is formally displayed, the initial animation update frequency of the at least one virtual model is obtained according to a display result of the previous picture of the virtual environment, so as to further count the resource consumption index. The matching degree between the initial animation update frequency of the virtual model determined in this way and a real-time display result of the animation frame of the virtual model is high, whereby the reliability of the initial animation update frequency is high, thereby improving the reliability of the resource consumption index determined based on the initial animation update frequency.

For example, the terminal stores a corresponding relationship between proportions and animation update frequencies. After determining the proportion of the first virtual model, the terminal can search for an animation update frequency corresponding to the proportion of the first virtual model according to the corresponding relationship between proportions and animation update frequencies, and then take the searched animation update frequency as the initial animation update frequency of the first virtual model.

The corresponding relationship between proportions and animation update frequencies is set based on experience or is flexibly adjusted according to application scenes. This embodiment of the present disclosure is not limited thereto. In the corresponding relationship between proportions and animation update frequencies, an animation update frequency corresponding to a first proportion is not lower than an animation update frequency corresponding to a second proportion. The first proportion is greater than the second proportion. That is to say, with the increase of a proportion, an animation update frequency corresponding to the proportion remains unchanged or increases.

In an exemplary embodiment, the terminal stores a corresponding relationship between proportion ranges and animation update frequencies. In this case, the animation update frequency corresponding to the proportion of the first virtual model refers to an animation update frequency corresponding to a proportion range where the proportion of the first virtual model is located. After determining the proportion of the first virtual model, the proportion range where the proportion of the first virtual model is located is determined, the animation update frequency corresponding to the proportion range where the proportion of the first virtual model is located is searched according to the corresponding relationship between proportion ranges and animation update frequencies, and then the searched animation update frequency is taken as the initial animation update frequency of the first virtual model. The corresponding relationship between proportion ranges and animation update frequencies is set based on experience or is flexibly adjusted according to application scenes. This embodiment of the present disclosure is not limited thereto. For example, in the corresponding relationship between proportion ranges and animation update frequencies, an animation update frequency corresponding to a first proportion range is not lower than an animation update frequency corresponding to a second proportion range. A lower limit of the first proportion range is greater than an upper limit of the second proportion range.

The initial animation update frequency of the at least one virtual model can be obtained with reference to the manner of obtaining the initial animation update frequency of the first virtual model. After obtaining the initial animation update frequency of the at least one virtual model, the resource consumption index is obtained based on the initial animation update frequency of the at least one virtual model.

The resource consumption index is used for indicating a quantity of resources required to be consumed for animation update according to the initial animation update frequency of the at least one virtual model. For example, a larger quantity of resources required to be consumed for animation update according to the initial animation update frequency of the at least one virtual model indicates more resources consumed for displaying the animation frame corresponding to the at least one virtual model according to the initial animation update frequency of the at least one virtual model, and lower display fluency of the animation frame.

In one embodiment, the manner of obtaining a resource consumption index based on an initial animation update frequency of at least one virtual model includes: obtaining a resource consumption sub-index of the at least one virtual model, and summarizing the resource consumption sub-index of the at least one virtual model to obtain the resource consumption index. The resource consumption sub-index of any virtual model is positively correlated with the initial animation update frequency of any virtual model. That is to say, as the initial animation update frequency of any virtual model is higher, the resource consumption sub-index of this virtual model is larger. As the initial animation update frequency of any virtual model is lower, the resource consumption sub-index of this virtual model is smaller. For example, the resource consumption sub-index of any virtual model is used for indicating a quantity of resources required to be consumed for animation update according to the initial animation update frequency of this virtual model.

The principle of obtaining the resource consumption sub-index of at least one virtual model is the same. Obtaining a resource consumption sub-index of a first virtual model is illustrated. The first virtual model is any virtual model in the at least one virtual model.

For example, the manner of obtaining the resource consumption sub-index of the first virtual model includes: determining a picture frame number corresponding to the initial animation update frequency of the first virtual model, and taking a positive number negatively correlated with the picture frame number as the resource consumption sub-index of the first virtual model. For example, a reciprocal of the picture frame number corresponding to the initial animation update frequency of the first virtual model is taken as the resource consumption sub-index of the first virtual model. For example, a product of the reciprocal of the picture frame number corresponding to the initial animation update frequency of the first virtual model and a certain positive number is taken as the resource consumption sub-index of the first virtual model.

The picture frame number corresponding to the initial animation update frequency of the first virtual model refers to a frame number of a picture through which an animation is updated once indicated by the initial animation update frequency of the first virtual model. For example, if the initial animation update frequency of the first virtual model is that the animation is updated once every five frames, the picture frame number corresponding to the initial animation update frequency of the first virtual model is 5.

For example, assuming that a default animation update frequency of the first virtual model is one animation update per frame, a larger picture frame number corresponding to the initial animation update frequency of the first virtual model indicates a greater degree to which the initial animation update frequency of the first virtual model is reduced relative to the default animation update frequency, and a smaller quantity of resources consumed for animation update according to the initial animation update frequency of the first virtual model.

The resource consumption sub-index of the at least one virtual model can be obtained with reference to the manner of obtaining the resource consumption sub-index of the first virtual model. After obtaining the resource consumption sub-index of the at least one virtual model, the resource consumption sub-index of the at least one virtual model is summarized to obtain the resource consumption index. For example, summarizing the resource consumption sub-index of the at least one virtual model refers to calculating a sum of the resource consumption sub-index of the at least one virtual model. For example, summarizing the resource consumption sub-index of the at least one virtual model means weighting and summing the resource consumption sub-index of the at least one virtual model using weights of the at least one virtual model, the weights of the at least one virtual model being set based on experience.

In step 202, a target animation update frequency of the at least one virtual model is obtained based on the resource consumption index and the initial animation update frequency.

After obtaining the resource consumption index, the target animation update frequency of the at least one virtual model is obtained based on the resource consumption index and the initial animation update frequency of the at least one virtual model. In this way, the resource consumption index is considered in the process of obtaining the target animation update frequency of the at least one virtual model, and resource consumption can be effectively and globally controlled according to the target animation update frequency of the at least one virtual model, thus avoiding long time consumed for displaying animation frames due to excessive resource consumption, and being beneficial to improving the display fluency of animation frames.

In one embodiment, the process of obtaining a target animation update frequency of the at least one virtual model based on the resource consumption index and the initial animation update frequency includes: taking the initial animation update frequency as the target animation update frequency of the at least one virtual model when the resource consumption index is not greater than a resource consumption threshold.

The resource consumption threshold is used for limiting a maximum quantity of resources required to be consumed for animation update according to the animation update frequency of the at least one virtual model. The resource consumption threshold is a pre-configured threshold.

In an exemplary embodiment, resource consumption thresholds corresponding to each category are set through a configuration table, whereby resource consumption caused by animation update of virtual models of each category is constrained by using the resource consumption thresholds corresponding to each category. For example, the at least one virtual model is a virtual model of a target category. In this case, the resource consumption threshold is a resource consumption threshold corresponding to the target category.

In an exemplary embodiment, the resource consumption threshold is used for constraining a global maximum number of virtual models that allow animations to be updated per frame. In an exemplary embodiment, the resource consumption threshold may also be referred to as a resource consumption budget or an animation update budget or the like.

When the resource consumption is not greater than the resource consumption threshold, it is indicated that animation update based on the initial animation update frequency of the at least one virtual model will not bring large resource consumption. In this case, the initial animation update frequency of the at least one virtual model may be directly taken as the target animation update frequency of the at least one virtual model. Taking the initial animation update frequency of the at least one virtual model as the target animation update frequency of the at least one virtual model means taking the initial animation update frequency of each virtual model as the target animation update frequency of each virtual model.

In one embodiment, the process of obtaining a target animation update frequency of the at least one virtual model based on the resource consumption index and the initial animation update frequency when the resource consumption index is greater than the resource consumption threshold includes exemplary step 1 to step 3.

Step 1: Determine an adjustment coefficient based on the resource consumption index and the resource consumption threshold.

When the resource consumption index is greater than the resource consumption threshold, it is indicated that animation update based on the initial animation update frequency of the at least one virtual model will bring large resource consumption. In this case, the initial animation update frequency of the at least one virtual model needs to be adjusted under the constraint of the resource consumption threshold to obtain a first animation update frequency capable of bringing smaller resource consumption.

The process of adjusting the initial animation update frequency of the at least one virtual model is implemented based on the adjustment coefficient. The adjustment coefficient is determined based on the resource consumption index and the resource consumption threshold. In one embodiment, the manner of determining an adjustment coefficient based on the resource consumption index and the resource consumption threshold is: taking a ratio of the resource consumption index to the resource consumption threshold as the adjustment coefficient. Since the resource consumption index is greater than the resource consumption threshold, the adjustment coefficient is a coefficient greater than 1.

Certainly, in some embodiments, the manner of determining an adjustment coefficient based on the resource consumption index and the resource consumption threshold may be another manner. This embodiment of the present disclosure is not limited thereto. For example, the ratio of the resource consumption threshold to the resource consumption index is taken as the adjustment coefficient. In this case, the adjustment coefficient is a coefficient less than 1.

Step 2: Adjust the initial animation update frequency based on the adjustment coefficient to obtain a first animation update frequency of the at least one virtual model.

After determining the adjustment coefficient, the initial animation update frequency of the at least one virtual model is adjusted based on the adjustment coefficient to obtain the first animation update frequency of the at least one virtual model. For example, the adjustment coefficient may also be referred to as a global load balance scaling coefficient since the adjustment coefficient is used for adjusting the initial animation update frequency of each virtual model.

The initial animation update frequency of each virtual model is adjusted based on the adjustment coefficient to obtain a first animation update frequency of each virtual model. The principle of adjusting the initial animation update frequency of each virtual model based on the adjustment coefficient is the same, and the process of adjusting an initial animation update frequency of a first virtual model based on the adjustment coefficient is illustrated. The first virtual model is any virtual model in the at least one virtual model.

The manner of adjusting the initial animation update frequency of the first virtual model based on the adjustment coefficient is related to the manner of determining the adjustment coefficient. The adjustment principle is that a first animation update frequency of the first virtual model is lower than the initial animation update frequency of the first virtual model.

In one embodiment, when the adjustment coefficient is the ratio of the resource consumption index to the resource consumption threshold, the manner of adjusting the initial animation update frequency of the first virtual model based on the adjustment coefficient is: calculating a product of a picture frame number corresponding to the initial animation update frequency of the first virtual model and the adjustment coefficient, and rounding the product to obtain a target value; and taking an animation update frequency with a corresponding picture frame number as the target value as the first animation update frequency of the first virtual model.

The manner of rounding the product may be set based on experience or may be flexibly adjusted according to application scenes. This embodiment of the present disclosure is not limited thereto. For example, the product may be rounded up, rounded down, rounded off, or the like. Taking rounding up as an example, the product may be rounded according to a Ceil function (rounding up function) to obtain a target value. After obtaining the target value, an animation update frequency with a corresponding picture frame number as the target value is taken as the first animation update frequency of the first virtual model.

For example, it is assumed that the initial animation update frequency of the first virtual model is an animation update every two frames (URO2), and the adjustment coefficient is 1.2. Then, the picture frame number corresponding to the initial animation update frequency of the first virtual model is 2, the product of the picture frame number corresponding to the initial animation update frequency of the first virtual model and the adjustment coefficient is 2.4, and the target value obtained by rounding up the product is 3. Then, the animation update frequency corresponding to the picture frame number is taken as the first animation update frequency of the first virtual model. In this case, the determined first animation update frequency of the first virtual model is an animation update every three frames (URO3).

With the above example in which the adjustment coefficient is the ratio of the resource consumption index to the resource consumption threshold, the process of adjusting the initial animation update frequency of the first virtual model based on the adjustment coefficient is introduced. This embodiment of the present disclosure is not limited thereto. When the adjustment coefficient is determined in other manners, the process of adjusting the initial animation update frequency of the first virtual model based on the adjustment coefficient may also be another process, as long as the adjusted first animation update frequency of the first virtual model is ensured to be lower than the initial animation update frequency.

The first animation update frequency of the at least one virtual model can be obtained with reference to the manner of obtaining the first animation update frequency of the first virtual model, and then step 3 is performed.

For example, the process of obtaining the first animation update frequency of the at least one virtual model according to step 1 and step 2 may be regarded as an animation update frequency obtained according to a load balance URO with load balance. Through global statistics of resource consumption of the virtual model of the target category, according to the pre-allocated resource consumption threshold, the animation update frequency is reduced according to the adjustment coefficient, thereby reducing a quantity of resources required for animation update, achieving the purpose of reducing the time consumption of global animation update, and thus improving FPS.

Step 3: Obtain the target animation update frequency of the at least one virtual model based on the first animation update frequency.

The process of obtaining the target animation update frequency of the at least one virtual model based on the first animation update frequency refers to the process of obtaining the target animation update frequency of each virtual model based on the first animation update frequency of each virtual model. The principle of obtaining the target animation update frequency of each virtual model based on the first animation update frequency of each virtual model is the same, and the process of obtaining a target animation update frequency of a first virtual model based on a first animation update frequency of the first virtual model is illustrated. The first virtual model is any virtual model in the at least one virtual model.

In one embodiment, the first animation update frequency of the first virtual model is directly taken as the target animation update frequency of the first virtual model. The efficiency of this manner is relatively high.

In one embodiment, the process of obtaining a target animation update frequency of the at least one virtual model based on the first animation update frequency includes: taking, when the first virtual model satisfies a first model screening condition and a first animation update frequency of the first virtual model is not higher than a reference animation update frequency, the reference animation update frequency as a target animation update frequency of the first virtual model; taking, when the first virtual model satisfies the first model screening condition and the first animation update frequency of the first virtual model is higher than the reference animation update frequency, or, when the first virtual model does not satisfy the first model screening condition, the first animation update frequency of the first virtual model as a target animation update frequency of the first virtual model. In this way, the first model screening condition is additionally considered on the basis of the adjustment coefficient, which is beneficial to improving the reliability of the obtained target animation update frequency of the first virtual model.

The first model screening condition is used for screening virtual models, and the first model screening condition is set based on experience or is flexibly adjusted according to application scenes. This embodiment of the present disclosure is not limited thereto.

A virtual model satisfying the first model screening condition refers to a virtual model with great demand for animation performance. For example, the virtual model satisfying the first model screening condition refers to a virtual model having the initial animation update frequency not lower than the reference animation update frequency. As the initial animation update frequency is higher, the importance of the virtual model may be considered to be higher. For example, the virtual model satisfying the first model screening condition may be referred to as a high-importance virtual model, and the virtual model satisfying the first model screening condition may be referred to as a low-importance virtual model.

The reference animation update frequency is set based on experience or is flexibly adjusted according to application scenes. This embodiment of the present disclosure is not limited thereto. For example, the reference animation update frequency is represented as URO5. It is assumed that the initial animation update frequency of a virtual model is represented as URO2. The virtual model satisfies the first model screening condition since an animation update frequency represented by URO2 is higher than an animation update frequency represented by URO5.

In some embodiments, it is also possible to determine whether the virtual model satisfies the first model screening condition by comparing the picture frame number corresponding to the initial animation update frequency of the virtual model with a picture frame number threshold. If the picture frame number corresponding to the initial animation update frequency of the virtual model is not greater than the picture frame number threshold, the virtual model satisfies the first model screening condition. The picture frame number threshold is set based on experience or is flexibly adjusted according to application scenes. This embodiment of the present disclosure is not limited thereto. For example, the picture frame number threshold is 5.

For example, the virtual model satisfying the first model screening condition may also refer to a virtual model having a proportion not smaller than a proportion threshold. The proportion threshold is set based on experience or is flexibly adjusted according to application scenes. This embodiment of the present disclosure is not limited thereto.

When the first virtual model satisfies the first model screening condition, it is indicated that the animation performance demand of the first virtual model is large. The target animation update frequency of the first virtual model needs to be not lower than the reference animation update frequency to ensure the animation performance effect of the first virtual model. Therefore, if the first virtual model satisfies the first model screening condition and the first animation update frequency of the first virtual model is not higher than the reference animation update frequency, the reference animation update frequency is taken as the target animation update frequency of the first virtual model. If the first virtual model satisfies the first model screening condition and the first animation update frequency of the first virtual model is higher than the reference animation update frequency, the first animation update frequency of the first virtual model is taken as the target animation update frequency of the first virtual model. That is to say, when the first virtual model satisfies the first model screening condition, a larger value in the first animation update frequency of the first virtual model and the reference animation update frequency is taken as the target animation update frequency of the first virtual model.

When the first virtual model does not satisfy the first model screening condition, it is indicated that the animation performance demand of the first virtual model is small. There is no need to limit the target animation update frequency of the first virtual model. Therefore, the first animation update frequency of the first virtual model may be directly taken as the target animation update frequency of the first virtual model.

The first model screening condition is additionally considered on the basis of the adjustment coefficient to ensure the animation performance of the high-importance virtual model. The first animation update frequency adjusted according to the adjustment coefficient (namely, the animation update frequency obtained after load balance URO) may be greatly reduced due to a large number of virtual models, that is, the picture frame number corresponding to the first animation update frequency becomes very large, resulting in excessive frequency reduction of a nearby virtual model. Therefore, for the high-importance virtual model, it is necessary to limit the target animation update frequency, whereby the target animation update frequency of the high-importance virtual model is not lower than the reference animation update frequency. The nearby virtual model refers to a virtual model which is close to a virtual camera in a virtual environment, and the animation performance of the nearby virtual model is usually required. The virtual camera refers to a camera used for shooting pictures of the virtual environment. For a virtual model, as the distance between the virtual model and the virtual camera is shorter, the size of the virtual model in the picture of the virtual environment is larger.

For example, assuming that the picture frame number threshold is 5, virtual models in the at least one virtual model, having the picture frame number corresponding to the initial animation update frequency less than or equal to 5, satisfy the first model screening condition, namely all belong to the high-importance virtual model. The picture frame number corresponding to the target animation update frequency of the virtual models needs to be limited to no more than 5. That is, the target animation update frequency is that the animation is at least updated once every five frames, thus ensuring that the high-importance model is updated once every five frames at most.

In step 203, an animation frame corresponding to the at least one virtual model is displayed according to the target animation update frequency.

The target animation update frequency is determined on the basis of the initial animation update frequency of the at least one virtual model in consideration of the resource consumption index, which can effectively and globally control the resource consumption. The effect of displaying animation frames corresponding to the at least one virtual model according to the target animation update frequency is better, which is beneficial to improving the display fluency of animation frames and further improving the fluency of picture update.

According to the target animation update frequency, the process of displaying animation frames corresponding to the at least one virtual model refers to the process of displaying animation frames corresponding to each virtual model according to the target animation update frequency of each virtual model. The animation frames corresponding to virtual models are displayed in the same frame of the virtual environment.

The principle of displaying an animation frame corresponding to each virtual model according to the target animation update frequency of each virtual model is the same, and the process of displaying an animation frame corresponding to a first virtual model according to a target animation update frequency of a first virtual model is illustrated. The first virtual model refers to any virtual model in the at least one virtual model.

In one embodiment, the implementation process of displaying the animation frame corresponding to the first virtual model according to the target animation update frequency of the first virtual model is: directly displaying the animation frame corresponding to the first virtual model according to the target animation update frequency of the first virtual model. In this case, the animation frame corresponding to the first virtual model refers to an animation frame corresponding to the target animation update frequency of the first virtual model. That is to say, the animation frame corresponding to the target animation update frequency of the first virtual model is directly displayed without determining whether the first virtual model satisfies a certain condition.

In an exemplary embodiment, the process of directly displaying the animation frame corresponding to the first virtual model according to the target animation update frequency of the first virtual model includes: displaying, when the target animation update frequency of the first virtual model is not matched with a count value of the first virtual model, a first animation frame or a target animation frame of the first virtual model; and displaying, when the target animation update frequency of the first virtual model is matched with the count value of the first virtual model, a second animation frame of the first virtual model.

The first animation frame is a latest animation frame displayed in an animation of the first virtual model. The second animation frame is an animation frame following the first animation frame in the animation of the first virtual model. The first animation frame and the second animation frame are two adjacent animation frames in the animation of the first virtual model. The first animation frame has been displayed, and the second animation frame has not been displayed. The calculation logic of the first animation frame and the second animation frame is complex, and time consumed for determining the first animation frame and the second animation frame is long. After displaying the first animation frame, the terminal may calculate and cache the second animation frame, and then extract the second animation frame from a cache for displaying when the second animation frame needs to be displayed.

The count value of the first virtual model refers to a count value currently possessed by the first virtual model. The count value of the first virtual model is used for indicating the number of non-updated picture frames of the animation of the first virtual model. In an exemplary embodiment, the manner of updating the count value of the first virtual model is as follows. When an animation frame in the animation of the first virtual model is displayed for the first time, the count value of the first virtual model is 0, and the count value of the first virtual model is increased by 1 every time a picture does not display an animation frame following the animation frame in the animation of the first virtual model.

Matching the target animation update frequency of the first virtual model with the count value of the first virtual model indicates that the second animation frame of the first virtual model needs to be displayed. For example, matching the target animation update frequency of the first virtual model with the count value of the first virtual model means that the count value of the first virtual model is not smaller than a difference between the picture frame number corresponding to the target animation update frequency of the first virtual model and 1. For example, if the picture frame number corresponding to the target animation update frequency of the first virtual model is 5 and the count value of the first virtual model is not less than 4, the target animation update frequency of the first virtual model is considered to be matched with the count value of the first virtual model.

When the target animation update frequency of the first virtual model is matched with the count value of the first virtual model, it is indicated that an animation frame to be displayed currently is the second animation frame of the first virtual model. Therefore, the second animation frame of the first virtual model is displayed. When the target animation update frequency of the first virtual model is not matched with the count value of the first virtual model, it is indicated that the animation frame to be displayed currently is not the second animation frame of the first virtual model. In this case, the first animation frame or the target animation frame of the first virtual model is displayed.

The target animation frame is determined based on the first animation frame, the second animation frame, and the count value of the first virtual model. Before displaying the target animation frame, it is necessary to determine the target animation frame first. For example, the manner of determining the target animation frame includes: determining candidate interpolation smoothing animation frames based on the first animation frame and the second animation frame; and determining an interpolation smoothing animation frame corresponding to the count value of the first virtual model among the candidate interpolation smoothing animation frames, and taking the interpolation smoothing animation frame corresponding to the count value of the first virtual model as the target animation frame of the first virtual model.

For example, the interpolation smoothing animation frame may be determined according to the first animation frame and the second animation frame in the cache to display the interpolation smoothing animation frame after displaying the first animation frame and before displaying the second animation frame, so as to achieve an animation effect close to the update per frame, namely close to an animation effect close to no frequency reduction. There may be one or more candidate interpolation smoothing animation frames. In the presence of one candidate interpolation smoothing animation frame, the candidate interpolation smoothing animation frame is directly taken as the interpolation smoothing animation frame corresponding to the count value of the first virtual model. In the presence of a plurality of candidate interpolation smoothing animation frames, the target animation frame of the first virtual model is one interpolation smoothing animation frame corresponding to the count value of the first virtual model among the plurality of candidate interpolation smoothing animation frames. For example, a corresponding relationship between candidate interpolation smoothing animation frames and count values is stored in the terminal, and the interpolation smoothing animation frame corresponding to the count value of the first virtual model may then be determined among the candidate interpolation smoothing animation frames according to the corresponding relationship.

For example, the number of candidate interpolation smoothing animation frames determined is the same as the number of count values not matched with the target animation update frequency of the first virtual model according to the first animation frame and the second animation frame in the cache. Each candidate interpolation smoothing animation frame corresponds to a count value not matched with the target animation update frequency of the first virtual model.

For example, the number of count values not matched with the target animation update frequency of the first virtual model is a difference between the picture frame number corresponding to the target animation update frequency of the first virtual model and 1. For example, if the picture frame number corresponding to the target animation update frequency of the first virtual model is 5, the number of count values not matched with the target animation update frequency of the first virtual model is 4, and four candidate interpolation smoothing animation frames may be determined.

The candidate interpolation smoothing animation frames can be calculated by the difference between the first animation frame and the second animation frame, and time consumed for calculating the candidate interpolation smoothing animation frames is shorter than time consumed for calculating the first animation frame and the second animation frame. The interpolation smoothing animation frame corresponding to the count value of the first virtual model is queried from the candidate interpolation smoothing animations, and the interpolation smoothing animation frame is the target animation frame.

In this embodiment of the present disclosure, the implementation of displaying, when the target animation update frequency of the first virtual model is not matched with a count value of the first virtual model, a first animation frame or a target animation frame of the first virtual model is not limited. For example, the first animation frame of the first virtual model is displayed when the target animation update frequency of the first virtual model is not matched with the count value of the first virtual model. For example, the target animation frame is displayed when the target animation update frequency of the first virtual model is not matched with the count value of the first virtual model.

For example, the first animation frame of the first virtual model is displayed when the target animation update frequency of the first virtual model is not matched with the count value of the first virtual model and the first virtual model does not satisfy a second model screening condition.

The target animation frame of the first virtual model is displayed when the first virtual model satisfies the second model screening condition.

The second model screening condition is used for screening virtual models, and the second model screening condition is set based on experience or is flexibly adjusted according to application scenes. This embodiment of the present disclosure is not limited thereto. The second model screening condition may be the same as the first model screening condition or may be different from the first model screening condition.

The virtual model satisfying the second model screening condition is a virtual model required to display the target animation frame when the target animation update frequency is not matched with the count value. In an exemplary embodiment, the second model screening condition is the same as the first model screening condition. That is, the virtual model satisfying the second model screening condition refers to a virtual model that requires greater animation performance.

If the first virtual model satisfies the second model screening condition, the target animation frame of the first virtual model is displayed, so as to alleviate the adverse effect of frequency reduction on animation performance to a great extent. That is to say, for a high-importance virtual model, animation interpolation smoothing is enabled. The high-importance virtual model will use the cached first animation frame and second animation frame for interpolation performance in a picture skipping update, so as to achieve the animation effect close to no frequency reduction.

If the first virtual model does not satisfy the second model screening condition, it is indicated that the attention of the animation performance of the first virtual model is low, and the first animation frame may be directly displayed.

In one embodiment, the implementation process of displaying the animation frame corresponding to the first virtual model according to the target animation update frequency of the first virtual model is: directly displaying the animation frame corresponding to the first virtual model according to the target animation update frequency of the first virtual model when the first virtual model is not associated with another virtual model; adjusting, when the first virtual model is associated with a second virtual model, the target animation update frequency of the first virtual model to an animation update frequency of the second virtual model to obtain an adjusted animation update frequency of the first virtual model; and displaying the animation frame corresponding to the first virtual model according to the adjusted animation update frequency of the first virtual model.

The second virtual model may refer to one virtual model in the at least one virtual model or a virtual model other than the at least one virtual model. This embodiment of the present disclosure is not limited thereto. The animation update frequency of the second virtual model refers to a current latest animation update frequency of the second virtual model. The terminal records an association relationship between virtual models. According to the association relationship, it can be determined whether the first virtual model is associated with another virtual model. If the first virtual model is associated with the second virtual model, the target animation update frequency of the first virtual model is adjusted to the animation update frequency of the second virtual model. For example, association of the first virtual model with the second virtual model may also be referred to as dependence of the first virtual model on the second virtual model.

In one embodiment, after adjusting the target animation update frequency of the first virtual model to the animation update frequency of the second virtual model, the method further includes: adjusting the count value of the first virtual model to a count value of the second virtual model to synchronize animation update of the first virtual model with animation update of the second virtual model.

The animation update of the first virtual model is synchronized with the animation update of the second virtual model for ensuring the correctness of the animation performance. Different virtual models may have different animation update frequencies after optimization, but the associated virtual models are required to be consistent in animation performance. For example, a virtual object and a virtual prop equipped for the virtual object are required to be consistent in animation performance. If the animation update frequencies of the associated virtual models are different, performance errors may be caused.

Therefore, in the process of displaying the animation frame corresponding to the first virtual model according to the target animation update frequency of the first virtual model, it is determined whether the first virtual model is associated with another virtual model. If the first virtual model is associated with the second virtual model, the frequency reduction synchronization is realized by adjusting the target animation update frequency of the first virtual model to the animation update frequency of the second virtual model and adjusting the count value of the first virtual model to the count value of the second virtual model, whereby the animation update of the first virtual model is synchronized with the animation update of the second virtual model. For example, since the first virtual model is associated with the second virtual model, the first virtual model may be referred to as a child model, and the second virtual model may be referred to as a parent model.

The implementation details of frequency reduction synchronization are as follows. Update frequencies of the parent and child models keep synchronous, and the update frequency of the parent model is adopted for the child model. Count values of the parent and child models are aligned. For example, update start frames of the parent and child models can be aligned by aligning the count values of the parent and child models. The update start frame refers to a picture initially displaying a latest displayed animation frame.

For example, the animation update frequencies and update start frames of the parent model and the child model are in four cases: the animation update frequencies and update start frames of the parent model and the child model are inconsistent; the animation update frequencies of the parent model and the child model are consistent while the update start frames are inconsistent; the animation update frequencies of the parent model and the child model are inconsistent while the update start frames are consistent; and the animation update frequencies and update start frames of the parent model and the child model are consistent.

FIG. 3 shows an animation update synchronization situation in the above four cases. In FIG. 3, a picture with an updated animation is referred to as an update frame, and a picture without an updated animation is referred to as a skip frame. According to FIG. 3, if the animation update frequencies and update start frames of the parent model and the child model are inconsistent, or the animation update frequencies of the parent model and the child model are consistent while the update start frames are inconsistent, or the animation update frequencies of the parent model and the child model are inconsistent while the update start frames are consistent, it is not enough for the animation updates of the parent model and the child model to be completely synchronized. Therefore, by adjusting the animation update frequency of the child model to the animation update frequency of the parent model and adjusting the count value of the child model to the count value of the parent model, an animation update synchronization effect is achieved.

Figure 4:
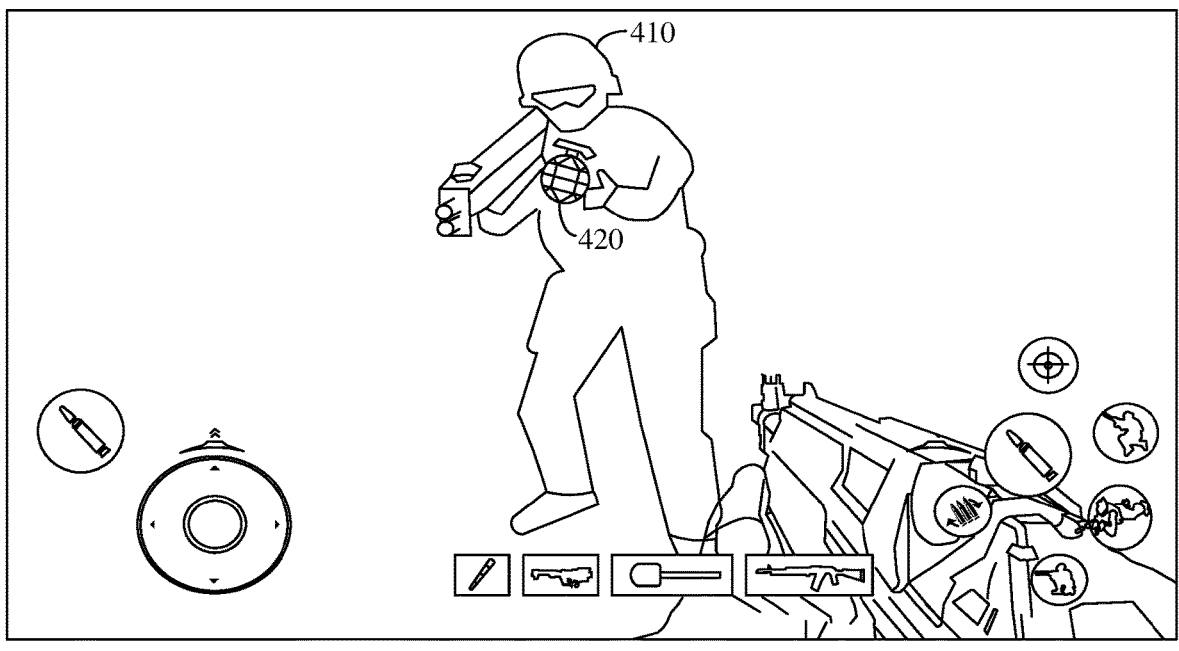
FIG. 4 is a schematic diagram of a picture display effect according to an embodiment of the present disclosure.

For example, FIG. 4 shows a picture display effect when the animation update frequencies and update start frames of the parent model and the child model are inconsistent. In FIG. 4, the parent model is a virtual object 410, and the child model is a virtual prop 420. An animation update frequency of the virtual object 410 is URO4, an animation update frequency of the virtual prop 420 is URO7, and an update start frame of the virtual object 410 and an update start frame of the virtual prop 420 are inconsistent. In FIG. 4, the problem that the virtual prop 420 is separated from the hand of the virtual object 410 is obvious, indicating that the animation updates of the virtual object 410 and the virtual prop 420 are not synchronized.

Figure 5:
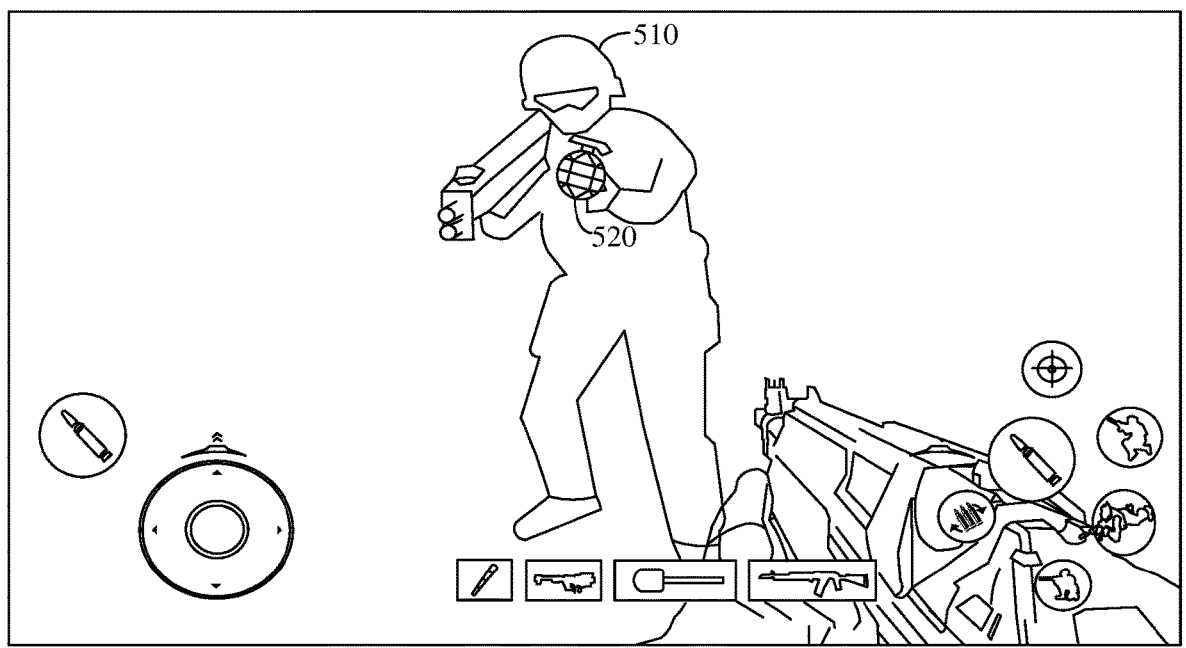
FIG. 5 is a schematic diagram of a picture display effect according to an embodiment of the present disclosure.

FIG. 5 shows a picture display effect when the animation update frequencies of the parent model and the child model are consistent while the update start frames are inconsistent. In FIG. 5, the parent model is a virtual object 510, and the child model is a virtual prop 520. An animation update frequency of the virtual object 510 and an animation update frequency of the virtual prop 520 are both URO4, and an update start frame of the virtual object 510 and an update start frame of the virtual prop 520 are inconsistent. In FIG. 5, the problem that the virtual prop 520 is separated from the hand of the virtual object 510 can still be observed, indicating that the animation updates of the virtual object 510 and the virtual prop 520 are not synchronized.

Figure 6:
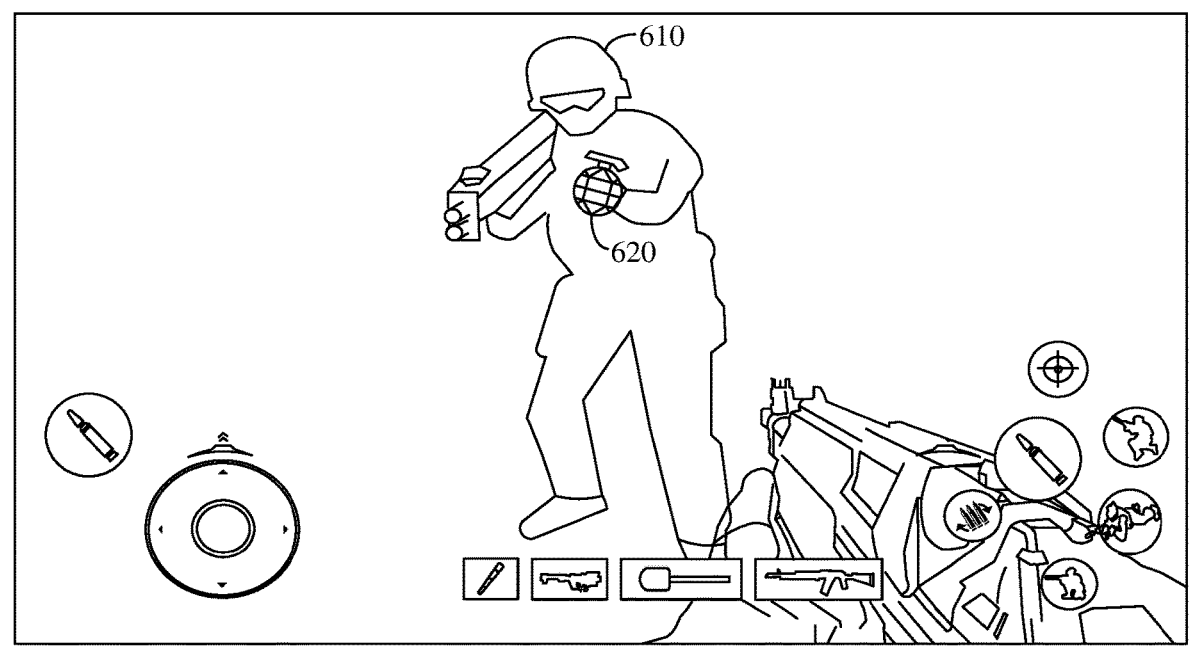
FIG. 6 is a schematic diagram of a picture display effect according to an embodiment of the present disclosure.

FIG. 6 shows a picture display effect when the animation update frequencies and update start frames of the parent model and the child model are consistent. In FIG. 6, the parent model is a virtual object 610, and the child model is a virtual prop 620. An animation update frequency of the virtual object 610 and an animation update frequency of the virtual prop 620 are both URO4, and an update start frame of the virtual object 610 and an update start frame of the virtual prop 620 are consistent. In FIG. 6, the virtual prop 620 is not separated from the hand of the virtual object 610, and the picture is presented normally, indicating that the animation updates of the virtual object 610 and the virtual prop 620 are synchronized.

When the adjusted animation update frequency of the first virtual model is obtained, the animation frame corresponding to the first virtual model is displayed according to the adjusted animation update frequency of the first virtual model. The implementation principle of displaying the animation frame corresponding to the first virtual model according to the adjusted animation update frequency of the first virtual model is the same as the implementation principle of directly displaying the animation frame corresponding to the first virtual model according to the target animation update frequency of the first virtual model, and will not be repeated herein.

In an exemplary embodiment, step 201 to step 203 may be performed each time the animation frame of the at least one virtual model needs to be displayed. In an exemplary embodiment, step 201 to step 203 are performed when the situation of the virtual model satisfies the reference condition, and the amount of calculation may be reduced.

This embodiment of the present disclosure is not limited to the display manner of the animation frame when the situation of the virtual model does not satisfy the reference condition. For example, when the situation of the virtual model does not satisfy the reference condition, the display of the animation frame is realized using the manner in the related art. For example, the manner in the related art is as follows: taking the animation update frequency corresponding to the proportion of the at least one virtual model as the initial animation update frequency of the at least one virtual model, and displaying the animation frame corresponding to the at least one virtual model according to the initial animation update frequency of the at least one virtual model.

For example, the proportion may also be referred to as a screen-to-body ratio. The manner in the related art is the display manner of animation frames based on a URO optimization scheme provided by a UE4 engine. The URO optimization scheme provided by the UE4 engine is that the screen-to-body ratio of each virtual model is calculated. As the screen-to-body ratio is smaller, the animation update frequency is lower. If the screen-to-body ratio is small, it may be considered that the virtual model is far away from the virtual camera. Thus, by reducing the animation update frequency of the virtual model far away from the virtual camera, the resource consumption of animation update of the virtual model can be effectively reduced. For example, a corresponding relationship between the screen-to-body ratio and the picture frame number may be set in advance. As the picture frame number is larger, the animation update frequency is lower. For example, the picture frame number may also be represented by the level of URO.

The reference condition is used for constraining the conditions for realizing the display of the animation frame according to the manners of step 201 to step 203. The reference condition is set based on experience or is flexibly adjusted according to application scenes. This embodiment of the present disclosure is not limited thereto. For example, the reference condition is used for constraining the situation of at least one virtual model. For example, the reference condition is used for constraining the situations of all virtual models required to display animation frames in the same screen.

The example in which the reference condition is used for constraining the situations of all virtual models required to display animation frames in the same screen is described. For example, the case where the situation of the virtual model satisfies the reference condition may refer to that the number of all virtual models required to display animation frames in the same screen is greater than a first number threshold. For example, the case where the situation of the virtual model satisfies the reference condition may refer to that the number of virtual models with proportions greater than a proportion threshold among all virtual models required to display animation frames in the same screen is greater than a second number threshold. For example, the case where the situation of the virtual model satisfies the reference condition may refer to that the number of all virtual models required to display animation frames in the same screen is greater than the first number threshold, and the number of virtual models with proportions greater than the proportion threshold among all the virtual models is greater than the second number threshold.

The first number threshold is not smaller than the second number threshold.

Figure 7:
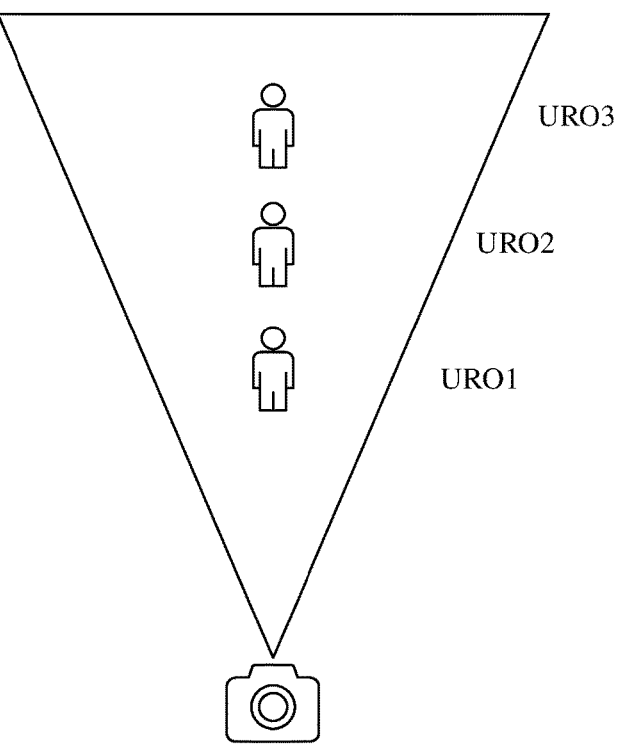
FIG. 7 is a schematic diagram of a virtual model distribution situation according to an embodiment of the present disclosure.

When there are few virtual models required to display animation frames on the same screen (the distribution of virtual models shown in FIG. 7), the display manner of animation frames in the related art is used for continuously retaining URO optimization features, and frequency reduction optimization is carried out according to the proportion.

For a virtual model with a small proportion, an animation is updated at a lower frequency to reduce time consumption caused by animation update. For example, the virtual model with the small proportion may be considered to be the virtual model farther away from the virtual camera, and such a virtual model, located remotely, may be invisible to an interactive object, thereby reducing the animation update frequency. In the case shown in FIG. 7, animation update frequencies for displaying animation frames of virtual models are URO1, URO2, and URO3 in order from near to far from the virtual camera using the manner in the related art.

Figure 8:
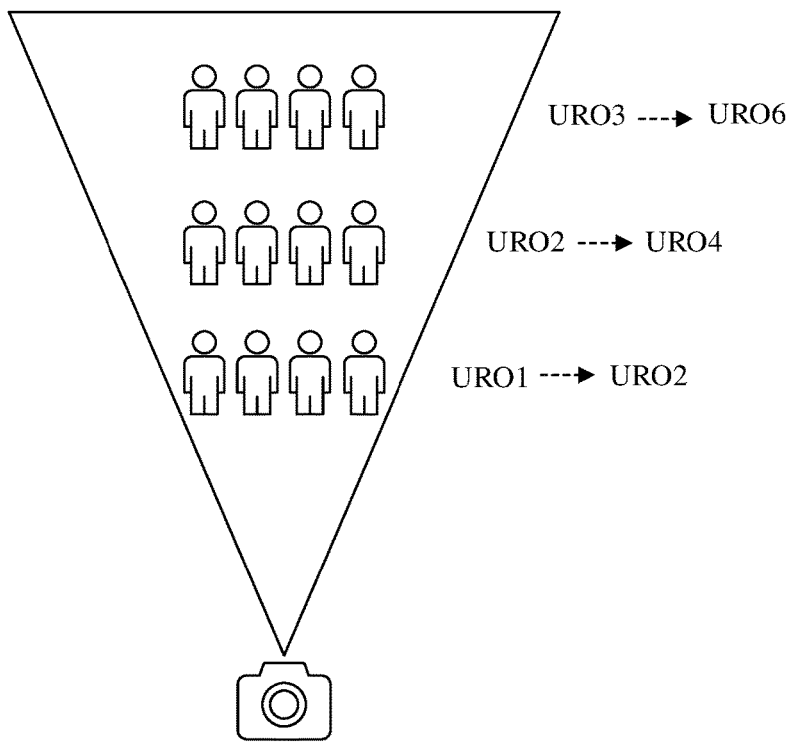
FIG. 8 is a schematic diagram of a virtual model distribution situation according to an embodiment of the present disclosure.

When there are many virtual models required to display animation frames on the same screen (the distribution of virtual models shown in FIG. 8), especially when there are a large number of virtual models with a large proportion (that is, close to the virtual camera), the display manner of animation frames in the related art (that is, the frequency reduction optimization manner according to the proportion) is used, the virtual models close to the virtual camera will still update the animation with a higher animation update frequency, for example, in order from near to far from the virtual camera. The animation update frequencies for displaying animation frames of the virtual models are URO1, URO2, and URO3, whereby the global animation update pressure is very large, more resources are consumed in scenarios such as a large number of virtual objects close to the virtual camera, the temperature of the terminal may be increased, FPS may be affected, and the display fluency of animation frames and the running fluency of applications may also be affected.

By utilizing the display manner of animation frames provided by this embodiment of the present disclosure, the performance of the scenario can be effectively improved. The display manner of animation frames provided by this embodiment of the present disclosure can globally count resource consumption indexes of virtual models per frame, and further reduce the animation update frequency of each virtual model if the resource consumption index exceeds the allocated resource consumption threshold. At the same time, animation interpolation smoothing optimization is carried out for the virtual model satisfying the first model screening condition, so as to avoid the detailed animation performance problem caused by frequency reduction. With this optimization manner, the animation update frequencies for displaying animation frames of virtual models are URO2, URO4, and URO6 in order from near to far from the virtual camera, which can effectively control the time consumption of displaying animation frames of a plurality of virtual models on the same screen.

Figure 9:
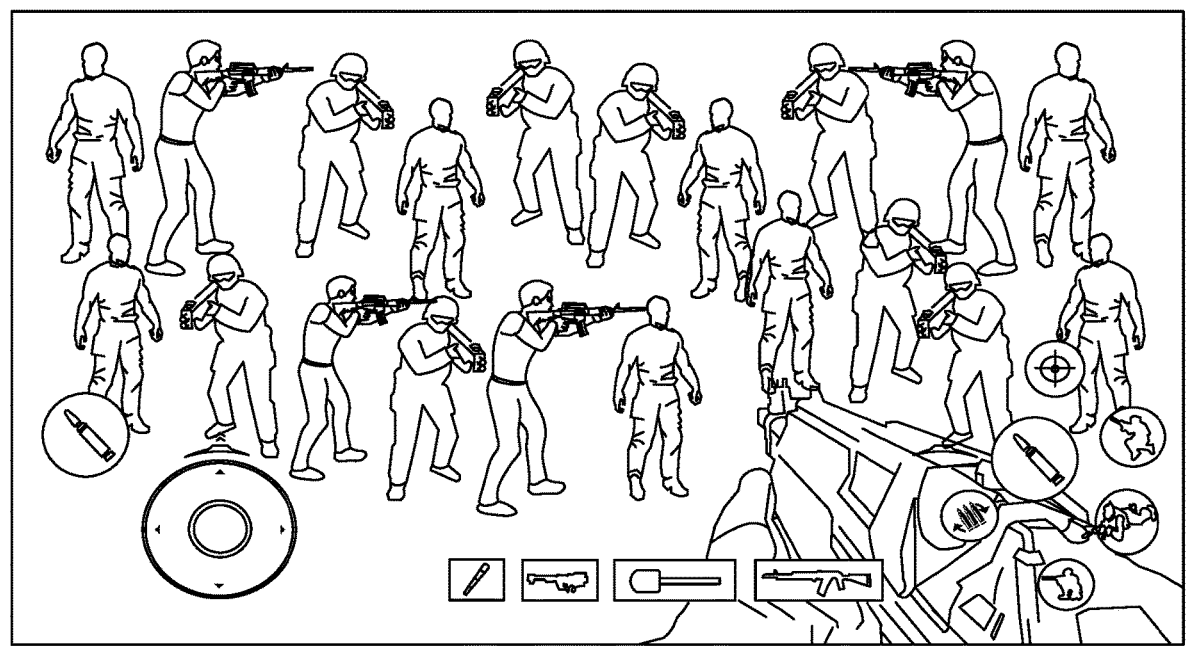
FIG. 9 is a schematic diagram of a picture display effect according to an embodiment of the present disclosure.
Figure 10:
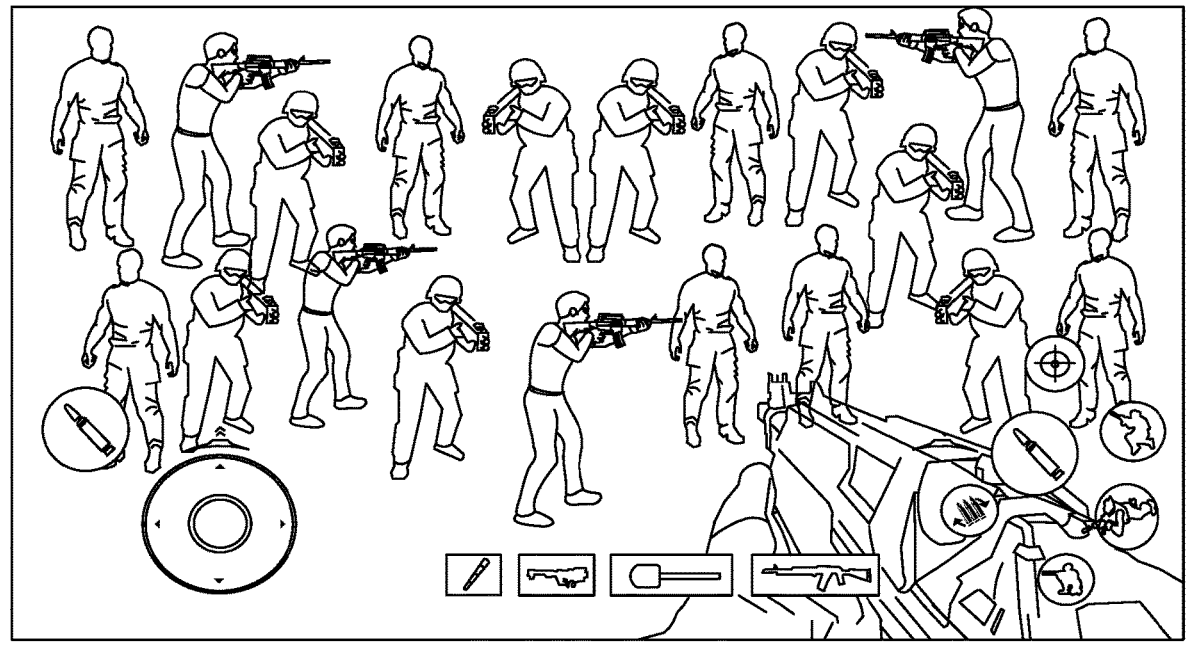
FIG. 10 is a schematic diagram of a picture display effect according to an embodiment of the present disclosure.

For example, the picture display effect in the display manner of animation frames in the related art is shown in FIG. 9, and the picture display effect in the display manner of animation frames in this embodiment of the present disclosure is shown in FIG. 10. In FIG. 9 and FIG. 10, the number of virtual models (also referred to as close-range virtual models) with a proportion greater than the proportion threshold is 20, and initial animation update frequencies of the 20 virtual models are URO1. That is, the 20 virtual models keep the animation updated once per frame. In this case, time for update per frame of the application is about 20 ms (milliseconds), and the FPS is 50.

Assuming that the resource consumption threshold is one virtual model, the animation update frequencies of the 20 virtual models are URO20 after the initial adjustment of load balance (namely, adjustment according to the constraint of the resource consumption threshold). Since the 20 virtual models all satisfy the first model screening condition (namely, all belong to high-importance models), the animation update frequency of the high-importance model is not allowed to be lower than URO5. Then by using the manner provided in this embodiment of the present disclosure, the target animation update frequencies of the 20 virtual models are URO5, that is, the animation is updated once every five frames. According to the target animation update frequency, the animation frames are displayed, and time for update per frame of the application is about 15.6 ms, and the FPS is improved to 64. Compared with the related art, the time for update per frame is reduced by 4.4 ms, and the FPS is improved by 16. As can be seen from FIG. 9 and FIG. 10, the picture display effects are different using different display manners of animation frames.

Figure 11:
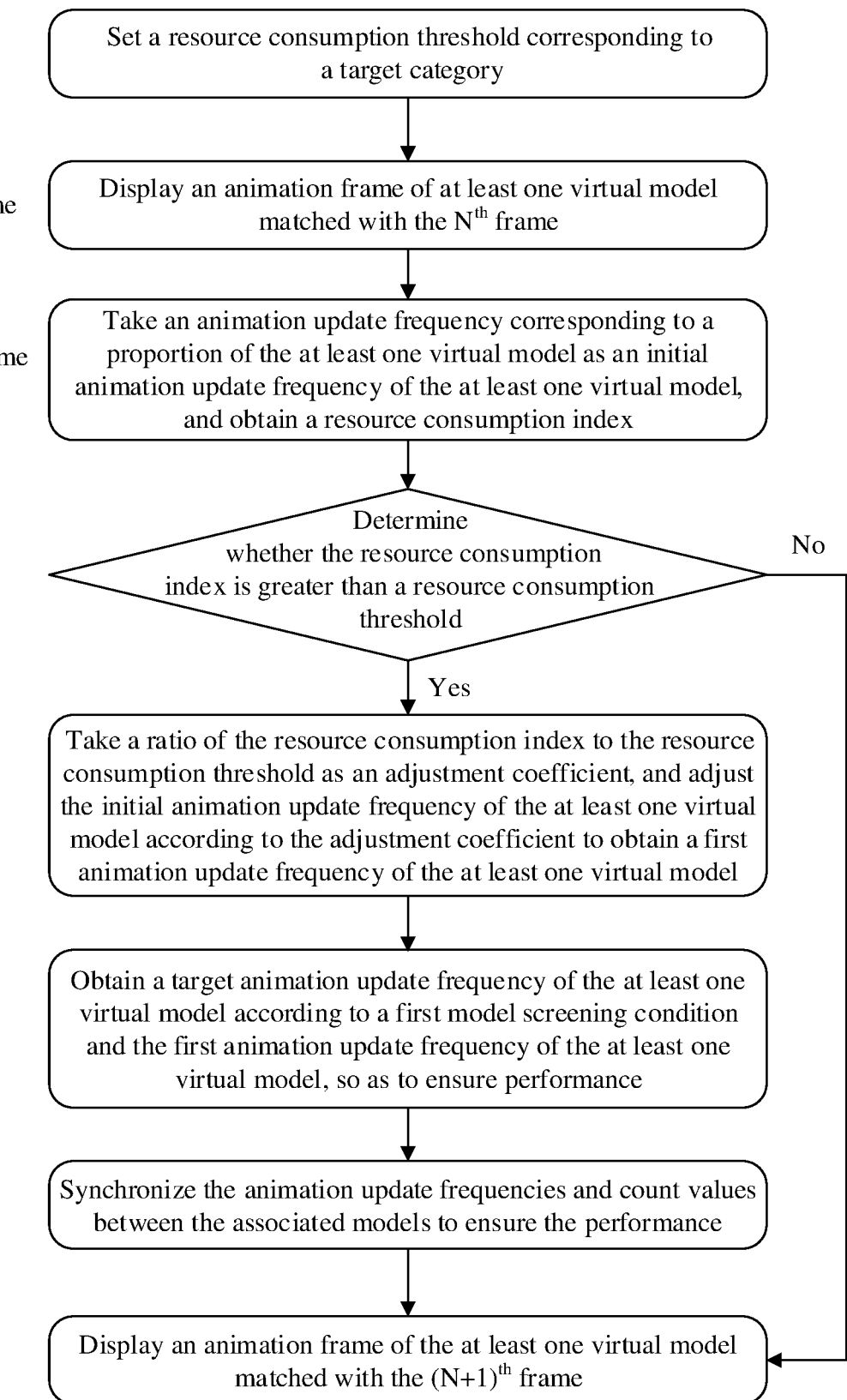
FIG. 11 is a schematic diagram of an animation frame display process according to an embodiment of the present disclosure.

For example, the display process of animation frames is shown in FIG. 11. A resource consumption threshold corresponding to a target category is set before the application is run. When displaying an $N^{th}$ frame (N is an integer not less than 1), an animation frame of at least one virtual model matched with the $N^{th}$ frame is displayed. The at least one virtual model is a virtual model of the target category. A proportion of the at least one virtual model is calculated according to a display result of the $N^{th}$ frame, and an animation update frequency corresponding to the proportion of the at least one virtual model is taken as an initial animation update frequency of the at least one virtual model. A resource consumption index is obtained based on the initial animation update frequency of the at least one virtual model, and it is determined whether the resource consumption index is greater than the resource consumption threshold.

If the resource consumption index is not greater than the resource consumption threshold, the animation frame corresponding to the at least one virtual model is displayed according to the initial animation update frequency of the at least one virtual model. The animation frame corresponding to the at least one virtual model refers to an animation frame of the at least one virtual model matched with an $(N+1)^{th}$ frame.

If the resource consumption index is greater than the resource consumption threshold, a ratio of the resource consumption index to the resource consumption threshold is taken as an adjustment coefficient. The initial animation update frequency of the at least one virtual model is adjusted according to the adjustment coefficient to obtain a first animation update frequency of the at least one virtual model. A target animation update frequency of the at least one virtual model is obtained according to a first model screening condition and the first animation update frequency of the at least one virtual model, so as to ensure the performance. The animation update frequencies and count values between the associated models are synchronized to ensure the performance. The animation frame corresponding to the at least one virtual model is displayed according to a latest animation update frequency of the at least one virtual model. The animation frame corresponding to the at least one virtual model refers to an animation frame of the at least one virtual model matched with the $(N+1)^{th}$ frame.

When at least one virtual model is a model of a target category and virtual models required to display animation frames on the same screen also include virtual models of other categories except the target category, the display process of animation frames of the virtual models of other categories may be realized by referring to the process provided by this embodiment of the present disclosure, so as to ensure the display effect of animation frames of all virtual models required to display animation frames on the same screen.

On the basis of the URO animation optimization technology provided by the UE4 engine, this embodiment of the present disclosure adds load balance optimization characteristics. By configuring and adjusting key parameters such as a resource consumption budget of a certain type of virtual model, a lowest animation update frequency of a high-importance model, and an animation interpolation smoothing condition, resources consumed for animation update in a multi-person scenario can be effectively controlled under the premise of ensuring animation performance, the time consumption of displaying animation frames of a plurality of virtual models on the same screen is effectively reduced, the balance of performance is achieved, and the FPS and the application experience are improved. For example, if the application is a game application, the game experience can be improved.

In the animation frame display method provided by this embodiment of the present disclosure, an animation frame corresponding to at least one virtual model is displayed according to a target animation update frequency of the at least one virtual model. The target animation update frequency of the at least one virtual model is determined on the basis of an initial animation update frequency of the at least one virtual model and in consideration of a resource consumption index. Resource consumption can be effectively and globally controlled according to the target animation update frequency of the at least one virtual model, which is beneficial to improving the display fluency of animation frames and thus improving the human-computer interaction rate.

In the process of determining the target animation update frequency by considering the resource consumption index, the resource consumption index is compared with a resource consumption threshold. When the resource consumption index is greater than the resource consumption threshold, an adjustment coefficient is determined according to the resource consumption index and the resource consumption threshold, and the animation update frequency is reduced according to the adjustment coefficient, thereby reducing a quantity of resources required for animation update, achieving the purpose of reducing the time consumption of global animation update, and thus improving FPS.

Further, a target animation update frequency of a high-importance virtual model is limited by considering a first model screening condition, whereby the target animation update frequency of the high-importance virtual model is not lower than a reference animation update frequency, and the animation performance of the high-importance virtual model is ensured.

In addition, when an animation frame of the virtual model is displayed according to the target animation update frequency of the virtual model, the target animation update frequency of the virtual model is compared with a count value of the virtual model. When the target animation update frequency of the virtual model is not matched with the count value of the virtual model, a target animation frame determined based on a first animation frame, a second animation frame, and the count value of the virtual model may be displayed. The target animation frame is an interpolation smoothing animation frame between the first animation frame and the second animation frame. Displaying the target animation frame can achieve an animation effect close to update per frame, that is, close to an animation effect without frequency reduction, and improve the display effect of the animation frame.

In addition, it is determined whether the virtual model is associated with another virtual model. If the virtual model is associated with another virtual model, the frequency reduction synchronization is realized by adjusting the target animation update frequency of the virtual model to an animation update frequency of the another virtual model and adjusting the count value of the virtual model to a count value of the another virtual model, whereby the animation update of the virtual model is synchronized with the animation update of the associated virtual model, and a correct animation performance is ensured.

Figure 12:
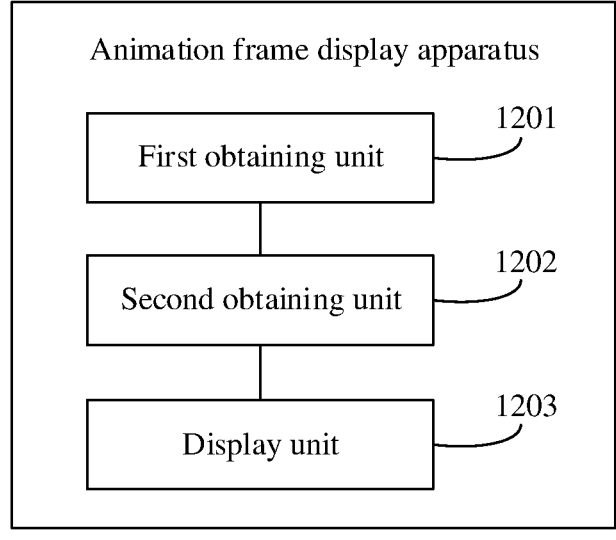
FIG. 12 is a schematic diagram of an animation frame display apparatus according to an embodiment of the present disclosure.

Referring to FIG. 12, this embodiment of the present disclosure provides an animation frame display apparatus. The apparatus includes:

a first obtaining unit 1201, configured to obtain a resource consumption index based on an initial animation update frequency of at least one virtual model, the resource consumption index indicating a quantity of resources required to be consumed for animation update according to the initial animation update frequency of the at least one virtual model;

a second obtaining unit 1202, configured to obtain a target animation update frequency of the at least one virtual model based on the resource consumption index and the initial animation update frequency; and a display unit 1203, configured to display an animation frame corresponding to the at least one virtual model according to the target animation update frequency.

In one embodiment, the second obtaining unit 1202 is configured to: determine, when the resource consumption index is greater than a resource consumption threshold, an adjustment coefficient based on the resource consumption index and the resource consumption threshold; adjust the initial animation update frequency based on the adjustment coefficient to obtain a first animation update frequency of the at least one virtual model; and obtain the target animation update frequency of the at least one virtual model based on the first animation update frequency.

In one embodiment, the second obtaining unit 1202 is configured to take, when a first virtual model satisfies a first model screening condition and a first animation update frequency of the first virtual model is not higher than a reference animation update frequency, the reference animation update frequency as a target animation update frequency of the first virtual model, the first virtual model being any virtual model in the at least one virtual model.

In one embodiment, the second obtaining unit 1202 is configured to take, when a first virtual model satisfies a first model screening condition and a first animation update frequency of the first virtual model is higher than a reference animation update frequency, or, when the first virtual model does not satisfy the first model screening condition, the first animation update frequency of the first virtual model as a target animation update frequency of the first virtual model, the first virtual model being any virtual model in the at least one virtual model.

In one embodiment, the adjustment coefficient is a ratio of the resource consumption index to the resource consumption threshold. The second obtaining unit 1202 is configured to: calculate a product of a picture frame number corresponding to the initial animation update frequency of a first virtual model and the adjustment coefficient, and round the product to obtain a target value, the first virtual model being any virtual model in the at least one virtual model; and take an animation update frequency with a corresponding picture frame number as the target value as the first animation update frequency of the first virtual model.

In one embodiment, the second obtaining unit 1202 is configured to take the initial animation update frequency as the target animation update frequency of the at least one virtual model when the resource consumption index is not greater than a resource consumption threshold.

In one embodiment, the display unit 1203 is configured to display, when a target animation update frequency of a first virtual model is not matched with a count value of the first virtual model, a first animation frame or a target animation frame of the first virtual model, the first virtual model being any virtual model in the at least one virtual model. The first animation frame is a latest animation frame displayed in an animation of the first virtual model. The target animation frame is determined based on the first animation frame, the second animation frame, and the count value of the first virtual model. The second animation frame is an animation frame following the first animation frame in the animation of the first virtual model.

In one embodiment, the display unit 1203 is configured to: display the first animation frame of the first virtual model when the first virtual model does not satisfy a second model screening condition; and display the target animation frame of the first virtual model when the first virtual model satisfies the second model screening condition.

In one embodiment, the display unit 1203 is further configured to: determine candidate interpolation smoothing animation frames based on the first animation frame and the second animation frame; and determine an interpolation smoothing animation frame corresponding to the count value of the first virtual model among the candidate interpolation smoothing animation frames, and take the interpolation smoothing animation frame corresponding to the count value of the first virtual model as the target animation frame of the first virtual model.

In one embodiment, the display unit 1203 is configured to display, when a target animation update frequency of a first virtual model is matched with a count value of the first virtual model, a second animation frame of the first virtual model, the first virtual model being any virtual model in the at least one virtual model. The second animation frame is an animation frame following the first animation frame in the animation of the first virtual model. The first animation frame is a latest animation frame displayed in the animation of the first virtual model.

In one embodiment, the display unit 1203 is configured to: adjust, when a first virtual model is associated with a second virtual model, a target animation update frequency of the first virtual model to an animation update frequency of the second virtual model to obtain an adjusted animation update frequency of the first virtual model, the first virtual model being any virtual model in the at least one virtual model; and display an animation frame corresponding to the first virtual model according to the adjusted animation update frequency of the first virtual model.

In one embodiment, the display unit 1203 is further configured to adjust a count value of the first virtual model to a count value of the second virtual model to synchronize animation update of the first virtual model with animation update of the second virtual model.

In one embodiment, the first obtaining unit 1201 is configured to: obtain a resource consumption sub-index of the at least one virtual model, the resource consumption sub-index of any virtual model being positively correlated with the initial animation update frequency of any virtual model; and summarize the resource consumption sub-index of the at least one virtual model to obtain the resource consumption index.

In one embodiment, the first obtaining unit 1201 is configured to: determine a picture frame number corresponding to the initial animation update frequency of a first virtual model, the first virtual model being any virtual model in the at least one virtual model; and take a positive number negatively correlated with the picture frame number as the resource consumption sub-index of the first virtual model.

In one embodiment, the first obtaining unit 1201 is further configured to: determine a proportion of a first virtual model, the first virtual model being any virtual model in the at least one virtual model, and the proportion of the first virtual model being a ratio of a rendering size of the first virtual model to a reference size; and take an animation update frequency corresponding to the proportion of the first virtual model as the initial animation update frequency of the first virtual model.

In one embodiment, the resource consumption threshold is a resource consumption threshold corresponding to a target category, and the at least one virtual model is a virtual model of the target category.

In one embodiment, the first obtaining unit 1201 is configured to obtain the resource consumption index based on the initial animation update frequency of the at least one virtual model when a situation of the virtual model satisfies a reference condition. The situation of the virtual model satisfies the reference condition in any one of the following cases: the number of all virtual models required to display animation frames in the same screen is greater than a first number threshold; the number of virtual models with proportions greater than a proportion threshold among all virtual models required to display animation frames in the same screen is greater than a second number threshold; the number of all virtual models required to display animation frames in the same screen is greater than the first number threshold, and the number of virtual models with proportions greater than the proportion threshold among all the virtual models is greater than the second number threshold; and a proportion of any virtual model is a ratio of a rendering size of any virtual model to a reference size.

In the animation frame display apparatus provided by this embodiment of the present disclosure, an animation frame corresponding to at least one virtual model is displayed according to a target animation update frequency of the at least one virtual model. The target animation update frequency of the at least one virtual model is determined on the basis of an initial animation update frequency of the at least one virtual model and in consideration of a resource consumption index. Resource consumption can be effectively and globally controlled according to the target animation update frequency of the at least one virtual model, which is beneficial to improving the display fluency of animation frames and thus improving the human-computer interaction rate.

In the process of determining the target animation update frequency by considering the resource consumption index, the resource consumption index is compared with a resource consumption threshold. When the resource consumption index is greater than the resource consumption threshold, an adjustment coefficient is determined according to the resource consumption index and the resource consumption threshold, and the animation update frequency is reduced according to the adjustment coefficient, thereby reducing a quantity of resources required for animation update, achieving the purpose of reducing the time consumption of global animation update, and thus improving FPS.

Further, a target animation update frequency of a high-importance virtual model is limited by considering a first model screening condition, whereby the target animation update frequency of the high-importance virtual model is not lower than a reference animation update frequency, and the animation performance of the high-importance virtual model is ensured.

In addition, when an animation frame of the virtual model is displayed according to the target animation update frequency of the virtual model, the target animation update frequency of the virtual model is compared with a count value of the virtual model. When the target animation update frequency of the virtual model is not matched with the count value of the virtual model, a target animation frame determined based on a first animation frame, a second animation frame, and the count value of the virtual model may be displayed. The target animation frame is an interpolation smoothing animation frame between the first animation frame and the second animation frame. Displaying the target animation frame can achieve an animation effect close to update per frame, that is, close to an animation effect without frequency reduction, and improve the display effect of the animation frame.

In addition, it is determined whether the virtual model is associated with another virtual model. If the virtual model is associated with another virtual model, the frequency reduction synchronization is realized by adjusting the target animation update frequency of the virtual model to an animation update frequency of the another virtual model and adjusting the count value of the virtual model to a count value of the another virtual model, whereby the animation update of the virtual model is synchronized with the animation update of the associated virtual model, and a correct animation performance is ensured.

When the apparatus provided in the foregoing embodiments is illustrated with division of the foregoing function units during the implementation of the functions thereof. In practical application, the foregoing functions may be allocated to and completed by different function units according to requirements. That is, the internal structure of the device is divided into different function units, so as to complete all or part of the functions described above. In addition, the apparatus provided in the foregoing embodiments and the method embodiments fall within the same conception. A specific implementation process is described in detail with reference to the method embodiments and will not be repeated herein.

Figure 13:
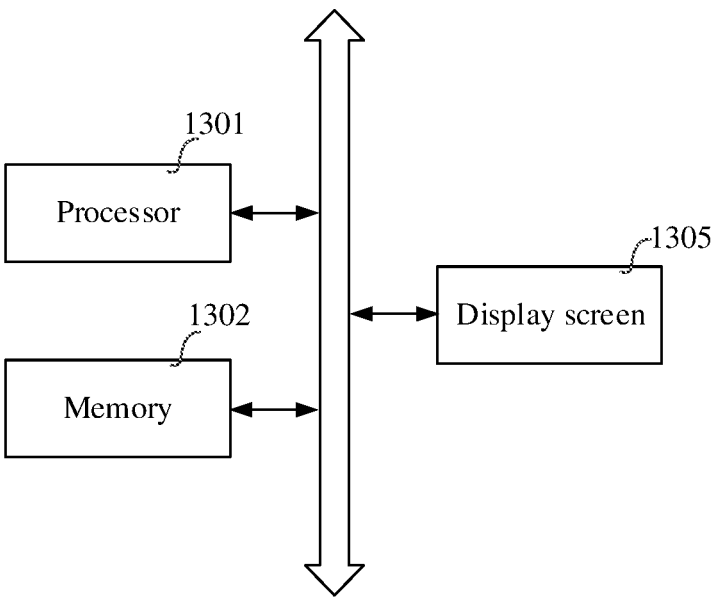
FIG. 13 is a schematic structural diagram of a computer device according to an embodiment of the present disclosure.

FIG. 13 is a schematic structural diagram of a computer device according to an embodiment of the present disclosure. The computer device may be a terminal. The terminal may be: a PC, a mobile phone, a smartphone, a PDA, a wearable device, a handheld portable game device, a PPC, a tablet computer, a smart OBU, a smart TV, a smart speaker, and a vehicle-mounted terminal. The terminal may also be referred to as another name such as user equipment, a portable terminal, a laptop terminal, or a desktop terminal.

Generally, the terminal includes: a processor 1301 and a memory 1302.

The processor 1301 may include one or more processing cores, for example, a 4-core processor or an 8-core processor. The processor 1301 may be implemented by at least one hardware form in a digital signal processing (DSP), a field-programmable gate array (FPGA), and a programmable logic array (PLA). The processor 1301 may further include a main processor and a co-processor. The main processor is a processor for processing data in a wake-up state, and is also referred to as a CPU. The co-processor is a low-power processor for processing data in a standby status. In some embodiments, the processor 1301 may be integrated with a graphics processing unit (GPU). The GPU is responsible for rendering and drawing content to be displayed by a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transient. The memory 1302 may further include a high-speed random access memory and a nonvolatile memory, for example, one or more disk storage devices or flash storage devices. In some embodiments, the non-transitory computer-readable storage medium in the memory 1302 is configured to store at least one instruction. The at least one instruction is used for execution by the processor 1301, whereby the terminal implements the animation frame display method according to the method embodiments of the present disclosure.

In some embodiments, the terminal further includes: a display screen 1305.

The display screen 1305 is configured to display a user interface (UI). The UI may include a graph, text, an icon, a video, and any combination thereof. When the display 1305 is a touch display, the display 1305 also has the ability to acquire a touch signal at or above the surface of the display 1305. The touch signal may be inputted to the processor 1301 as a control signal for processing. In this case, the display screen 1305 may be further configured to provide a virtual button and/or a virtual keyboard that are/is also referred to as a soft button and/or a soft keyboard. In some embodiments, there may be one display screen 1305 disposed on a front panel of the terminal. In some other embodiments, there may be at least two display screens 1305 respectively disposed on different surfaces of the terminal or in a folded design. In still other embodiments, the display screen 1305 may be a flexible display screen disposed on a curved or folded surface of the terminal. Even, the display screen 1305 may be further set in a non-rectangular irregular pattern, namely, a special-shaped screen. The display screen 1305 may be prepared by using materials such as a liquid crystal display (LCD) or an organic light-emitting diode (OLED). For example, an animation frame corresponding to at least one virtual model is displayed through the display screen 1305.

It is to be understood by a person skilled in the art that the structure shown in FIG. 13 is not limiting of the terminal and may include more or fewer assemblies than illustrated, or some assemblies may be combined, or different assembly arrangements may be employed.

In an exemplary embodiment, a non-volatile computer-readable storage medium is also provided. The non-volatile computer-readable storage medium stores at least one computer program. The at least one computer program is loaded and executed by a processor of a computer device, whereby a computer implements the animation frame display method as described in any of the above.

In one embodiment, the non-volatile computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program product is also provided. The computer program product includes computer programs or computer instructions. The computer programs or the computer instructions are loaded and executed by a processor, whereby a computer implements the animation frame display method as described in any of the above.

The term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In the present disclosure, the terms "first", "second", and the like are intended to distinguish similar objects but do not necessarily indicate a specific order or sequence. It is to be understood that such used data is interchangeable where appropriate so that the embodiments of the present disclosure described here can be implemented in an order other than those illustrated or described here. The implementations described in the above exemplary embodiments do not represent all implementations consistent with the present disclosure. On the contrary, the implementations are merely examples of apparatuses and methods that are consistent with some aspects of the present disclosure.

It is to be understood that "plurality" mentioned in the specification means two or more. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship.

The above descriptions are merely exemplary embodiments of the present disclosure, but are not intended to limit the present disclosure. Any modification, equivalent replacement, or improvement made within the principle of the present disclosure shall fall within the scope of protection of the present disclosure.

What is claimed is:

1. An animation frame display method, performed by an electronic device, the method comprising:

obtaining a resource consumption index based on an initial animation update frequency of at least one virtual model, the resource consumption index indicating a quantity of resources required to be consumed for animation update according to the initial animation update frequency of the at least one virtual model, the at least one virtual model including a first virtual model and a second virtual model, the initial animation update frequency of the first virtual model including a quantity N1 indicating that an animation of the first virtual model is updated every N1 frames, and the initial animation update frequency of the second virtual model including a quantity N2 indicating that an animation of the second virtual model is updated every N2 frames, N2 being different from N1;

determining, in response to the resource consumption index being greater than a resource consumption threshold, an adjustment coefficient based on the resource consumption index and the resource consumption threshold;

adjusting the initial animation update frequency of the at least one virtual model based on the adjustment coefficient to obtain a first animation update frequency of the at least one virtual model, the first animation update frequency of the first virtual model including a quantity M1 indicating that the animation of the first virtual model is updated every M1 frames, the first animation update frequency of the second virtual model including a quantity M2 indicating that the animation of the second virtual model is updated every M2 frames, M1 being an integer greater than N1, M2 being an integer greater than N2;

obtaining a target animation update frequency of the at least one virtual model based on the resource consumption index and the first animation update frequency; and displaying an animation frame corresponding to the at least one virtual model according to the target animation update frequency.

2. The method according to claim 1, wherein obtaining the target animation update frequency of the at least one virtual model based on the first animation update frequency comprises:

taking, when the first virtual model satisfies a first model screening condition and the first animation update frequency of the first virtual model is not higher than a reference animation update frequency, the reference animation update frequency being as a target animation update frequency of the first virtual model.

3. The method according to claim 1, wherein obtaining the target animation update frequency of the at least one virtual model based on the first animation update frequency comprises:

taking, when the first virtual model satisfies a first model screening condition and the first animation update frequency of the first virtual model is higher than a reference animation update frequency, or, when the first virtual model does not satisfy the first model screening condition, the first animation update frequency of the first virtual model being as a target animation update frequency of the first virtual model.

4. The method according to claim 1, wherein the adjustment coefficient is a ratio of the resource consumption index to the resource consumption threshold; and adjusting the initial animation update frequency based on the adjustment coefficient to obtain the first animation update frequency of the at least one virtual model comprises:

multiplying the quantity N1 corresponding to the initial animation update frequency of the first virtual model with the adjustment coefficient to obtain a product, and rounding the product to obtain a target value; and taking the target value as the quantity M1 for the first animation update frequency of the first virtual model.

5. The method according to claim 1, wherein the resource consumption threshold is a resource consumption threshold corresponding to a target category, and the at least one virtual model is a virtual model of the target category.

6. The method according to claim 1, further comprising:

taking the initial animation update frequency as the target animation update frequency of the at least one virtual model when the resource consumption index is not greater than the resource consumption threshold.

7. The method according to claim 1, wherein displaying the animation frame corresponding to the at least one virtual model according to the target animation update frequency comprises:

displaying, when a target animation update frequency of the first virtual model is not matched with a count value of the first virtual model, a first animation frame or a target animation frame of the first virtual model, the first animation frame being a latest animation frame displayed in an animation of the first virtual model, the target animation frame being determined based on the first animation frame, a second animation frame, and the count value of the first virtual model, and the second animation frame being an animation frame following the first animation frame in animation of the first virtual model.

8. The method according to claim 7, wherein displaying the first animation frame or the target animation frame of the first virtual model comprises:

displaying the first animation frame of the first virtual model when the first virtual model does not satisfy a second model screening condition; and displaying the target animation frame of the first virtual model when the first virtual model satisfies the second model screening condition.

9. The method according to claim 8, the method further comprising:

determining candidate interpolation smoothing animation frames based on the first animation frame and the second animation frame; and determining an interpolation smoothing animation frame corresponding to the count value of the first virtual model among candidate interpolation smoothing animation frames, and taking the interpolation smoothing animation frame corresponding to the count value of the first virtual model as the target animation frame of the first virtual model.

10. The method according to claim 1, wherein displaying the animation frame corresponding to the at least one virtual model according to the target animation update frequency comprises:

displaying, when a target animation update frequency of the first virtual model is matched with a count value of the first virtual model, a second animation frame of the first virtual model, the second animation frame being an animation frame following the first animation frame in animation of the first virtual model, and the first animation frame being a latest animation frame displayed in the animation of the first virtual model.

11. The method according to claim 1, wherein displaying the animation frame corresponding to the at least one virtual model according to the target animation update frequency comprises:

adjusting, when the first virtual model is associated with the second virtual model, a target animation update frequency of the first virtual model to an animation update frequency of the second virtual model to obtain an adjusted animation update frequency of the first virtual model; and displaying an animation frame corresponding to the first virtual model according to the adjusted animation update frequency of the first virtual model.

12. The method according to claim 11, the method further comprising:

adjusting a count value of the first virtual model to a count value of the second virtual model to synchronize animation update of the first virtual model with animation update of the second virtual model.

13. The method according to claim 1, wherein obtaining the resource consumption index based on the initial animation update frequency of the at least one virtual model comprises:

obtaining a resource consumption sub-index of the at least one virtual model, the resource consumption sub-index of a virtual model being positively correlated with the initial animation update frequency of a virtual model; and summarizing the resource consumption sub-index of the at least one virtual model to obtain the resource consumption index.

14. The method according to claim 13, wherein obtaining the resource consumption sub-index of the at least one virtual model comprises:

determining a picture frame number corresponding to the initial animation update frequency of the first virtual model; and taking a positive number that is negatively correlated with the picture frame number as the resource consumption sub-index of the first virtual model.

15. The method according to claim 1, further comprising:

determining a proportion of the first virtual model, and the proportion of the first virtual model being a ratio of a rendering size of the first virtual model to a reference size; and taking an animation update frequency corresponding to the proportion of the first virtual model as the initial animation update frequency of the first virtual model.

16. The method according to claim 1, wherein obtaining the resource consumption index based on the initial animation update frequency of the at least one virtual model comprises:

obtaining the resource consumption index based on the initial animation update frequency of the at least one virtual model when a situation of the virtual model satisfies a reference condition, wherein:

the situation of the virtual model satisfying the reference condition includes: number of all virtual models required to display animation frames in a same screen is greater than a first number threshold; or number of virtual models with proportions greater than a proportion threshold among all virtual models required to display animation frames in the same screen is greater than a second number threshold; or the number of all virtual models required to display animation frames in the same screen is greater than the first number threshold, and the number of virtual models with proportions greater than the proportion threshold among all the virtual models is greater than the second number threshold; and a proportion of a virtual model is a ratio of a rendering size of the virtual model to a reference size.

17. A computer device, comprising a processor and a memory, the memory storing at least one computer instruction, and the at least one computer instruction being loaded and executed by the processor for performing:

obtaining a resource consumption index based on an initial animation update frequency of at least one virtual model, the resource consumption index indicating a quantity of resources required to be consumed for animation update according to the initial animation update frequency of the at least one virtual model, the at least one virtual model including a first virtual model and a second virtual model, the initial animation update frequency of the first virtual model including a quantity N1 indicating that an animation of the first virtual model is updated every N1 frames, and the initial animation update frequency of the second virtual model including a quantity N2 indicating that an animation of the second virtual model is updated every N2 frames, N2 being different from N1;

determining, in response to the resource consumption index being greater than a resource consumption threshold, an adjustment coefficient based on the resource consumption index and the resource consumption threshold;

adjusting the initial animation update frequency of the at least one virtual model based on the adjustment coefficient to obtain a first animation update frequency of the at least one virtual model, the first animation update frequency of the first virtual model including a quantity M1 indicating that the animation of the first virtual model is updated every M1 frames, the first animation update frequency of the second virtual model including a quantity M2 indicating that the animation of the second virtual model is updated every M2 frames, M1 being an integer greater than N1, M2 being an integer greater than N2;

obtaining a target animation update frequency of the at least one virtual model based on the resource consumption index and the first animation update frequency; and displaying an animation frame corresponding to the at least one virtual model according to the target animation update frequency.

18. A non-transitory computer-readable storage medium, storing at least one computer program, the at least one computer program being loaded and executed by a processor for performing:

obtaining a resource consumption index based on an initial animation update frequency of at least one virtual model, the resource consumption index indicating a quantity of resources required to be consumed for animation update according to the initial animation update frequency of the at least one virtual model, the at least one virtual model including a first virtual model and a second virtual model, the initial animation update frequency of the first virtual model including a quantity N1 indicating that an animation of the first virtual model is updated every N1 frames, and the initial animation update frequency of the second virtual model including a quantity N2 indicating that an animation of the second virtual model is updated every N2 frames, N2 being different from N1;

determining, in response to the resource consumption index being greater than a resource consumption threshold, an adjustment coefficient based on the resource consumption index and the resource consumption threshold;

adjusting the initial animation update frequency of the at least one virtual model based on the adjustment coefficient to obtain a first animation update frequency of the at least one virtual model, the first animation update frequency of the first virtual model including a quantity M1 indicating that the animation of the first virtual model is updated every M1 frames, the first animation update frequency of the second virtual model including a quantity M2 indicating that the animation of the second virtual model is updated every M2 frames, M1 being an integer greater than N1, M2 being an integer greater than N2;

obtaining a target animation update frequency of the at least one virtual model based on the resource consumption index and the first animation update frequency; and displaying an animation frame corresponding to the at least one virtual model according to the target animation update frequency.

* * * * *